(12) United States Patent  
Georgeson et al.

(10) Patent No.: US 12,136,964 B2  
(45) Date of Patent: Nov. 5, 2024

(54) METHODS FOR THROUGH-STRUCTURE POWER AND DATA TRANSFER BETWEEN MOBILE ROBOTS AND SENSOR NODES

(71) Applicant: The Boeing Company, Chicago, IL (US)

(72) Inventors: Gary E. Georgeson, Tacoma, WA (US); Joseph L. Hafenrichter, Seattle, WA (US); James J. Troy, Issaquah, WA (US); Gregory J. Sweers, Renton, WA (US); Jeong-Beom Ihn, Bellevue, WA (US)

(73) Assignee: The Boeing Company, Arlington, VA (US)

( * ) Notice: Subject to any disclaimer, the term of this patent is extended or adjusted under 35 U.S.C. 154(b) by 167 days.

(21) Appl. No.: 17/953,146

(22) Filed: Sep. 26, 2022

(65) Prior Publication Data

US 2023/0051276 A1 Feb. 16, 2023

Related U.S. Application Data

(62) Division of application No. 17/398,892, filed on Aug. 10, 2021, now Pat. No. 11,502,729.

(51) Int. Cl.
*H02J 50/80* (2016.01)
*G01C 9/00* (2006.01)
*G01S 17/08* (2006.01)
*G05D 1/00* (2024.01)
*H02J 7/02* (2016.01)
*H04B 5/26* (2024.01)

(Continued)

(52) U.S. Cl.
CPC ............. *H04B 5/73* (2024.01); *H02J 50/80* (2016.02); *H04B 5/26* (2024.01); *H04B 5/72* (2024.01)

(58) Field of Classification Search
None
See application file for complete search history.

(56) References Cited

U.S. PATENT DOCUMENTS 8,983,374 B2 * 3/2015 Wiley ............... H04B 5/79 455/41.1
8,983,794 B1 * 3/2015 Motzer ............. G01B 21/04 702/155

(Continued)

*Primary Examiner* — Tuan A Tran
(74) *Attorney, Agent, or Firm* — Ostrager Chong Flaherty & Broitman P.C.

(57) ABSTRACT

A method for wirelessly coupling respective transducers of an automated motion platform and a sub-surface sensor node through a skin of a limited-access structure for the purpose of wireless power and data transfer. Coordinates of an as-designed position of the transducer of the sensor node in a local coordinate system of the limited-access structure are retrieved from a non-transitory tangible computer-readable storage medium. Then coordinates of a target position on an external surface of the skin of the limited-access structure are estimated. The target position is calculated to be aligned with the as-designed position of the transducer of the sensor node. The motion platform is moved under computer control so that the transducer onboard the motion platform moves toward the target position. Movement ceases when the transducer onboard the motion platform is at the target position. Then wave energy is transferred between the aligned transducers.

20 Claims, 24 Drawing Sheets

(51) Int. Cl.
    *H04B 5/72*          (2024.01)
    *H04B 5/73*          (2024.01)
    *H04N 7/18*          (2006.01)

(56) References Cited

U.S. PATENT DOCUMENTS

| | | | | |
|---|---|---|---|---|
| 9,182,487 | B2 * | 11/2015 | Troy | G01S 17/88 |
| 9,221,506 | B1 * | 12/2015 | Georgeson | B25J 5/007 |
| 9,285,296 | B2 * | 3/2016 | Georgeson | G01N 21/8422 |
| 9,287,719 | B2 * | 3/2016 | Katsunaga | B60L 53/305 |
| 9,379,780 | B2 * | 6/2016 | Widmer | H02J 50/12 |
| 9,676,285 | B2 * | 6/2017 | Niederhauser | B60L 53/36 |
| 9,739,844 | B2 * | 8/2017 | Widmer | H02J 50/60 |
| 9,804,577 | B1 * | 10/2017 | Troy | G01N 29/4472 |
| 9,837,204 | B2 * | 12/2017 | Widmer | H02J 7/00034 |
| 9,866,068 | B2 * | 1/2018 | Yamakawa | B60L 53/126 |
| 9,899,145 | B2 * | 2/2018 | Covic | H01F 27/2823 |
| 9,923,605 | B2 * | 3/2018 | Fukaya | H04B 5/72 |
| 9,964,941 | B2 * | 5/2018 | Liu | G05B 19/402 |
| 10,404,107 | B2 * | 9/2019 | Ichikawa | H04B 5/79 |
| 10,632,852 | B2 * | 4/2020 | Ricci | B60L 3/0092 |
| 10,640,234 | B1 * | 5/2020 | Douglas | B60L 53/35 |
| 10,997,483 | B2 * | 5/2021 | Rizzo | H01Q 1/246 |
| 11,671,145 | B2 * | 6/2023 | Daga | H04B 5/72 |
| | | | | 455/41.1 |
| 11,750,245 | B2 * | 9/2023 | Shichino | H04B 5/79 |
| | | | | 307/104 |
| 2018/0361595 | A1 * | 12/2018 | Troy | B25J 9/162 |
| 2019/0118657 | A1 * | 4/2019 | Wang | B60L 53/39 |
| 2021/0271244 | A1 * | 9/2021 | Bondurant | G01S 15/88 |
| 2022/0416581 | A1 * | 12/2022 | Ganesh | H02J 50/90 |
| 2023/0045915 | A1 * | 2/2023 | Schreurs | B60L 53/65 |

\* cited by examiner

METHODS FOR THROUGH-STRUCTURE POWER AND DATA TRANSFER BETWEEN MOBILE ROBOTS AND SENSOR NODES

RELATED PATENT APPLICATION

This application is a divisional of and claims priority from U.S. patent application Ser. No. 17/398,892 filed on Aug. 10, 2021.

BACKGROUND

This disclosure generally relates to methods for wirelessly coupling components of a robot-mounted end effector to components of a sub-surface sensor node in a limited-access structure, such as an airplane.

Radio-frequency (RF) coupling across composite and metal skins is being developed to enable internal or back-side sensors (hereinafter "sub-surface sensors") to be charged or temporarily powered and then accessed for data collection or system programming. However, the processes currently in use on aircraft employ human/manual positioning of a probe for power or data transfer. Access for human positioning is not always adaptable to positioning a probe on a surface of a limited-access structure for wireless transfer of power and data. Tear-down or disassembly is sometimes required. In other cases, physical access to a wireless transfer site may be difficult, time consuming, and manually intensive due to the size of the structure or limited access to the wireless transfer site.

SUMMARY

The subject matter disclosed in some detail below is directed to methods for through-structure power and data transfer between components on a mobile platform (also referred to herein as "an automated motion platform") and components of a sub-surface (e.g., embedded) sensor node in a limited-access structure (e.g., an airplane). In accordance with various embodiments, the methods utilize mobile robots to provide power to and receive sensor data from sub-surface sensor nodes by wireless coupling of components. The components are positioned to enable wireless coupling using the localization methods disclosed herein. Optionally, the wirelessly coupled components may also be used to transfer computer instructions from the motion platform to the sensor node.

In accordance with the technology proposed in this disclosure, the wirelessly coupled components are bidirectional transducers (hereinafter "transducers"). Bidirectional transducers convert physical phenomena to electrical signals and also convert electrical signals into physical phenomena. An example of an inherently bidirectional transducer is an antenna, which can convert radio waves (electromagnetic waves) into an electrical signal to be processed by a radio receiver, or convert an electrical signal from a transmitter into radio waves. Another example is an inductive charging coil, which is used in wireless power transfer to convert an electrical power signal into electromagnetic waves or convert electromagnetic waves into an electrical power signal.

In accordance with one localization method proposed herein, coordinates of an as-designed position of a transducer of the sensor node in a local coordinate system of the limited-access structure are retrieved from a non-transitory tangible computer-readable storage medium. Then coordinates of a target position on an external surface of the skin of the limited-access structure are estimated. The target position is calculated to be aligned with the as-designed position of the transducer of the sensor node. The mobile platform is moved under computer control so that a transducer onboard the mobile robot moves toward the target position and into alignment with the transducer of the sensor node. Movement ceases when the transducer onboard the mobile robot is at the target position. Then wave energy is transferred between the aligned transducers.

As used herein, the term "location" includes position in a coordinate system and orientation relative to that same coordinate system. The convention is adopted herein that a point in a three-dimensional coordinate system has a position and does not have an orientation. As used herein, the term "localization" refers to a process for estimating the location of an instrument or device (or the position of a point on the instrument or device) relative to a local coordinate system of a target object.

As used herein, the term "probe" means a device that includes one or more transducers. A "probe" may optionally include a housing configured to house the transducer or transducers. In accordance with some embodiments, the probe includes an inductive charging coil and a radiofrequency (RF) antenna. In general, an inductive charging coil is usually considered to be an electronic component made of wound wire that is connected at both ends to form a part of a closed circuit (e.g., closed loop), whereas an antenna is a wire connected only at one end (e.g., open loop). In accordance with one embodiment disclosed herein, a closed-loop inductive charging coil is converted to an open-loop antenna using a switching unit that breaks (i.e., opens) the closed-loop coil to create an open-loop element that is connected to the other electronic components only at one end and disconnected (open) at the other end. This changes the wire loop from one form (inductive charging coil) into another (antenna).

In accordance with some embodiments, the robotic through-structure power and data transfer method proposed herein includes a three-dimensional (3-D) positioning capability to enable the system to accurately locate and record 3-D positions of sub-surface antennas and/or coils. In some embodiments, the 3-D position data, defined in the coordinate system of the target object, is used to guide a probe-equipped mobile robot to an approximate (coarse) position, after which a signal strength-based position refinement process determines the precise (fine) position at which data extraction and/or sensor system charging is performed wirelessly.

In accordance with one embodiment, a laser beam is projected onto a target position for guiding the probe onboard the mobile robot to an optimal position for wireless coupling with the sub-surface sensor node. The mobile robot is equipped with a light detector (e.g., a camera) which captures images of the target position. In an alternative embodiment, an optical motion capture system is used to capture images of a probe-carrying robot which is also equipped with retro-reflective markers. The acquired image data is processed to determine the deviation of the current position of the robot probe from its target position (which overlies the sensor node). A navigation processor is configured to convert pixel data representing position deviation information into motion commands calculated to align the robot probe with the transducer(s) of the sub-surface sensor node.

Although various embodiments of methods for through-structure power and data transfer between a mobile robot and a sub-surface sensor node on a limited-access structure will be described in some detail below, one or more of those embodiments may be characterized by one or more of the following aspects.

One aspect of the subject matter disclosed in detail hereinafter is a method for through-structure power and data transfer between a motion platform and a sensor node, the method comprising: (a) acquiring and storing coordinates representing an estimated position of a transducer of a sensor node under a skin of a target object in a three-dimensional coordinate system of the target object; (b) calculating coordinates of an estimated target position on an external surface of the skin which is aligned with a position of the transducer of the sensor node in three-dimensional coordinates of the target object; (c) using a sensor (e.g., strain gauge, pressure transducer, thermocouple) of the sensor node to collect sensor data (e.g., strain, pressure, temperature) during operation of the target object; (d) navigating the motion platform to a coarse position on the external surface of the target object where a transducer position of a transducer onboard the motion platform has coordinates which match the coordinates of the estimated target position; and (e) transferring power from the transducer onboard the motion platform to the transducer of the sensor node after the motion platform has arrived at the coarse position.

In accordance with one embodiment of the method described in the immediately preceding paragraph, step (e) comprises transmitting first RF signals using the transducer onboard the motion platform, and the method further comprises: (f) detecting the first RF signals using the antenna of the sensor node; (g) transmitting second RF signals using the antenna of the sensor node in response to detection of the first RF signals; (h) detecting the second RF signals using the antenna onboard the motion platform; (i) sensing a strength of the detected second RF signals onboard the motion platform; (j) moving the motion platform incrementally to a position where the sensed strength of the received second RF signals is increased; and (k) determining whether the sensed strength of the received second RF signals is a maximum or not. Steps (f) through (k) are iteratively performed until a determination is made in step (k) that the sensed strength of the received second RF signals is maximum (a local or global maximum). This optimized wireless coupling of respective transducers of the motion platform and sensor node enables power and/or data transfer.

Another aspect of the subject matter disclosed in detail hereinafter is a method for through-structure power and data transfer between a motion platform and a sensor node, the method comprising: (a) acquiring and storing coordinates representing an estimated position of a first transducer of a sensor node under a skin of a target object in a three-dimensional coordinate system of the target object; (b) calculating coordinates of an estimated target position on an external surface of the skin which is aligned with a position of the transducer of the sensor node in three-dimensional coordinates of the target object; (c) using a sensor of the sensor node to collect sensor data during operation of the target object; (d) navigating the motion platform to a coarse position on the external surface of the target object where a transducer position of a first transducer onboard the motion platform has coordinates which match the coordinates of the estimated target position; (e) transmitting first RF signals using the first transducer onboard the motion platform after the motion platform has arrived at the coarse position; (f) receiving the first RF signals using the first transducer of the sensor node; (g) transmitting second RF signals using a second transducer of the sensor node in response to reception of the first RF signals; (h) receiving the second RF signals using a second transducer onboard the motion platform; (i) sensing a strength of the received second RF signals onboard the motion platform; (j) moving the motion platform incrementally to a position where the sensed strength of the received second RF signals is increased; and (k) determining whether the sensed strength of the received second RF signals is a maximum or not. Steps (f) through (k) are iteratively performed until a determination is made in step (k) that the sensed strength of the received second RF signals is maximum.

A further aspect of the subject matter disclosed in detail hereinafter is an automated motion platform comprising: a power source; an inductive charging circuit connected to the power source; a first transducer connected to the inductive charging circuit; a processor module connected to the power source and comprising a transceiver; and a second transducer (antenna) that is connected to the transceiver. The first and second transducers have respective planar spiral transducer configurations which are mutually coplanar. The inductive charging circuit is configured to tune the first transducer to produce a magnetic field that oscillates at a resonant frequency. In accordance with one embodiment, the first transducer surrounds the second transducer. In accordance with another embodiment, the first and second transducers are positioned side by side.

Other aspects of methods for through-structure power and data transfer between a mobile robot and a sub-surface sensor node in a limited-access structure are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

Figure 1:
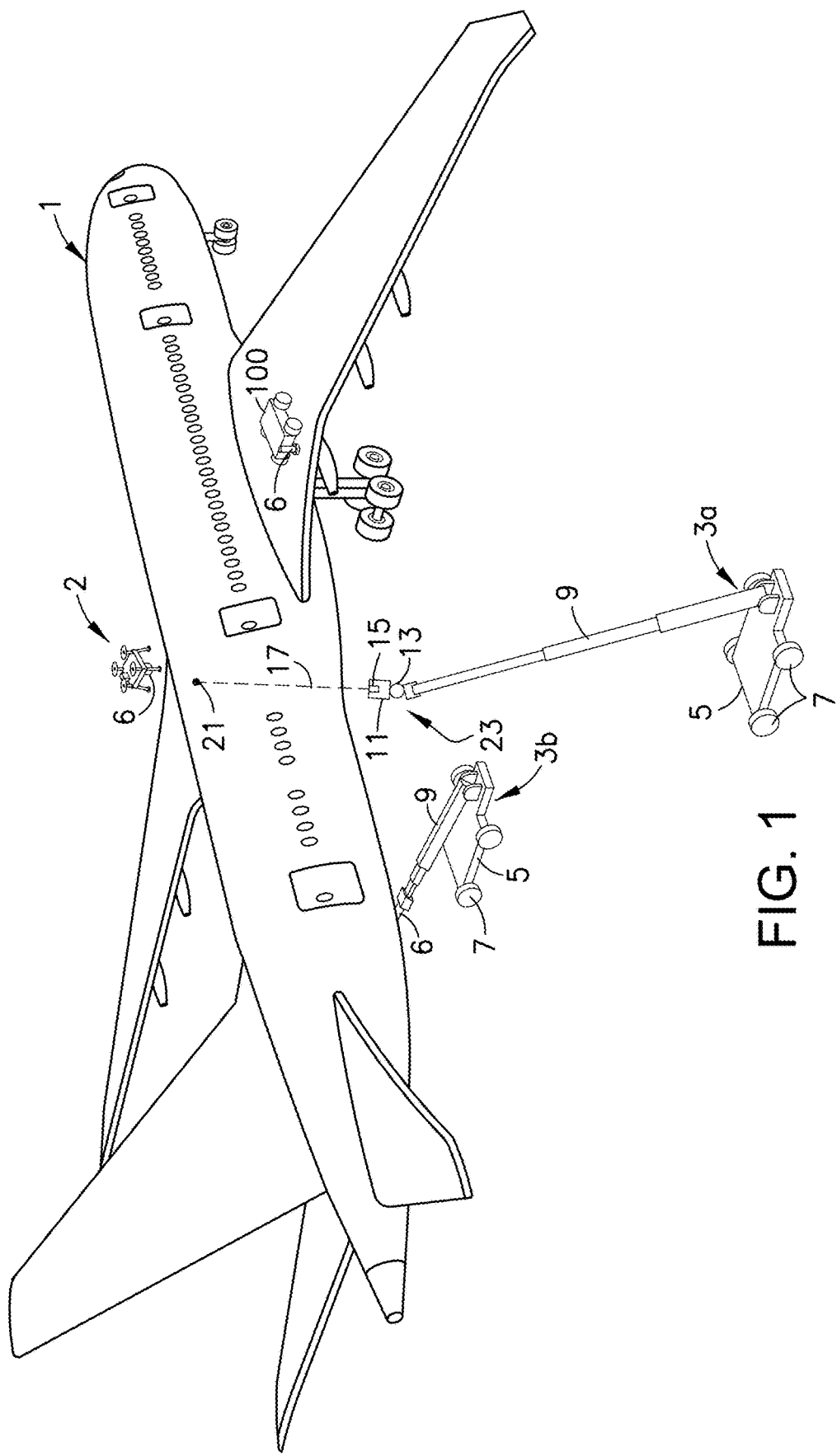
FIG. 1 is a diagram representing a three-dimensional (3-D) view of a scenario in which probes carried by mobile robots are wirelessly coupled to hidden sub-surface sensor nodes (not visible in FIG. 1) of an aircraft that is on the ground.

Illustrative embodiments of methods for through-structure power and data transfer between a mobile robot and a sub-surface sensor node in a limited-access structure are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The automated systems and methods disclosed herein have the capability to align a transducer onboard an automated motion platform with a transducer of a sub-surface sensor node. For purposes of illustration, embodiments will be described which are capable of wirelessly transferring power, data, or computer instructions between an automated motion platform and a sub-surface sensor node onboard an aircraft. However, it should be appreciated that the principles disclosed herein also have application during wireless transfer of power, data, or computer instructions between an automated motion platform and a sub-surface sensor node installed on a structure other than an aircraft.

In accordance with one embodiment, automated wireless transfer of data from or computer instructions to a sub-surface sensor node is implemented by equipping an automated motion platform with an end effector (hereinafter "probe") which is configured to wirelessly couple with a transducer of a sub-surface sensor node. As the motion platform moves during a localization process, the three-dimensional (3-D) position of the probe axis is continuously tracked. The motion of the probe is controlled based on feedback from a location tracking system so that the probe axis (e.g., a coil axis) becomes aligned or nearly aligned with the antenna axis of the sub-surface sensor node. Various tracking and positioning systems may be used to place the probe in a position where its transducer is aligned with the transducer of the sub-surface sensor node.

Once the probe and sensor node transducers are aligned on opposite sides of the skin of a structure, power and data transfer actions can begin. These actions may include one or more of the following: (a) sensor node battery or capacitor charging through power transmission; (b) sensor node activation to collect sensor data (if data has not been previously collected); (c) sensor node activation to send collected sensor data through the structural wall to be received by the transceiver onboard the motion platform; (d) modify, update, or re-set a sensor node processor module to alter its functioning parameters for future data collection; and (e) test the sensor node.

In an alternative embodiment, the systems may be set to provide the flow of energy between the inductive charging coils in the reverse direction, i.e., from the target object to the motion platform. This would be to provide a dedicated charging spot for an unmanned aerial vehicle (UAV) or crawler vehicle using a power source within the airplane (instead of an isolated sensor-based module).

FIG. 1 is a diagram representing a three-dimensional (3-D) view of a scenario in which probes carried by mobile robots are wirelessly coupled to hidden sub-surface sensor nodes of an aircraft 1 that is on the ground. Some of the sensor nodes are accessible (via wireless coupling) using a UAV 2 which is equipped with a probe 6. The structure of a typical UAV will be described later with reference to FIG. 7. Other sensor nodes are accessible using a motion platform 3b which is equipped with a probe 6. In addition, some sensor nodes (e.g., sensor nodes embedded in the wing of the aircraft 1) are accessible using a crawler vehicle 100 which carries a probe 6. In each case, the probe is configured to enable power and data transfer between the mobile robot and the sensor node.

The motion platform 3b includes a mobile base 5, a plurality of wheels 7 rotatably coupled to the mobile base 5, and a telescopic arm 9 having a proximal end which is rotatably coupled to the mobile base 5 and a distal end to which the probe 6 is attached. The probe 6 includes one or more transducers and a housing that houses the transducer or transducers.

The system depicted in FIG. 1 further includes a motion platform 3a, which is configured similarly to motion platform 3b, but which is also equipped with a local positioning system (LPS), indicated generally at 23. The LPS 23 is shown here on a telescopic arm 9, but it can be mounted on other types of stable platforms or stationary placements within the environment. As briefly noted above, motion platform 3a includes a mobile base 5, a plurality of wheels 7 rotatably coupled to the mobile base 5, and a telescopic arm 9 having a proximal end which is rotatably coupled to the mobile base 5 and a distal end to which LPS 23 is mounted. The LPS 23 includes a pan-tilt unit 13 which is attached to the distal end of telescopic arm 9 of motion platform 3a, a video camera 11 that is attached to pan-tilt unit 13, and a laser range meter 15 mounted to video camera 11. The laser range meter 15 may be operated to project a laser beam at various positions on the external surface of the aircraft 1 overlying a sub-surface sensor node. Some of those positions are accessible by the UAV 2; others are inaccessible by the UAV 2 and instead may be accessed using the motion platform 3a.

In the example situation depicted in FIG. 1, the laser beam 17 projected by LPS 10 is directed to form a laser spot 21 at a position on the external surface that is accessible by the UAV 2. The UAV 2 may use the laser spot 21 to navigate to a position where its probe 6 is aligned with a transducer of a sub-surface sensor node having a center underlying the laser spot 21. The process of navigating a mobile robot using laser beam guidance will be described in more detail later with reference to FIG. 15.

Figure 2:
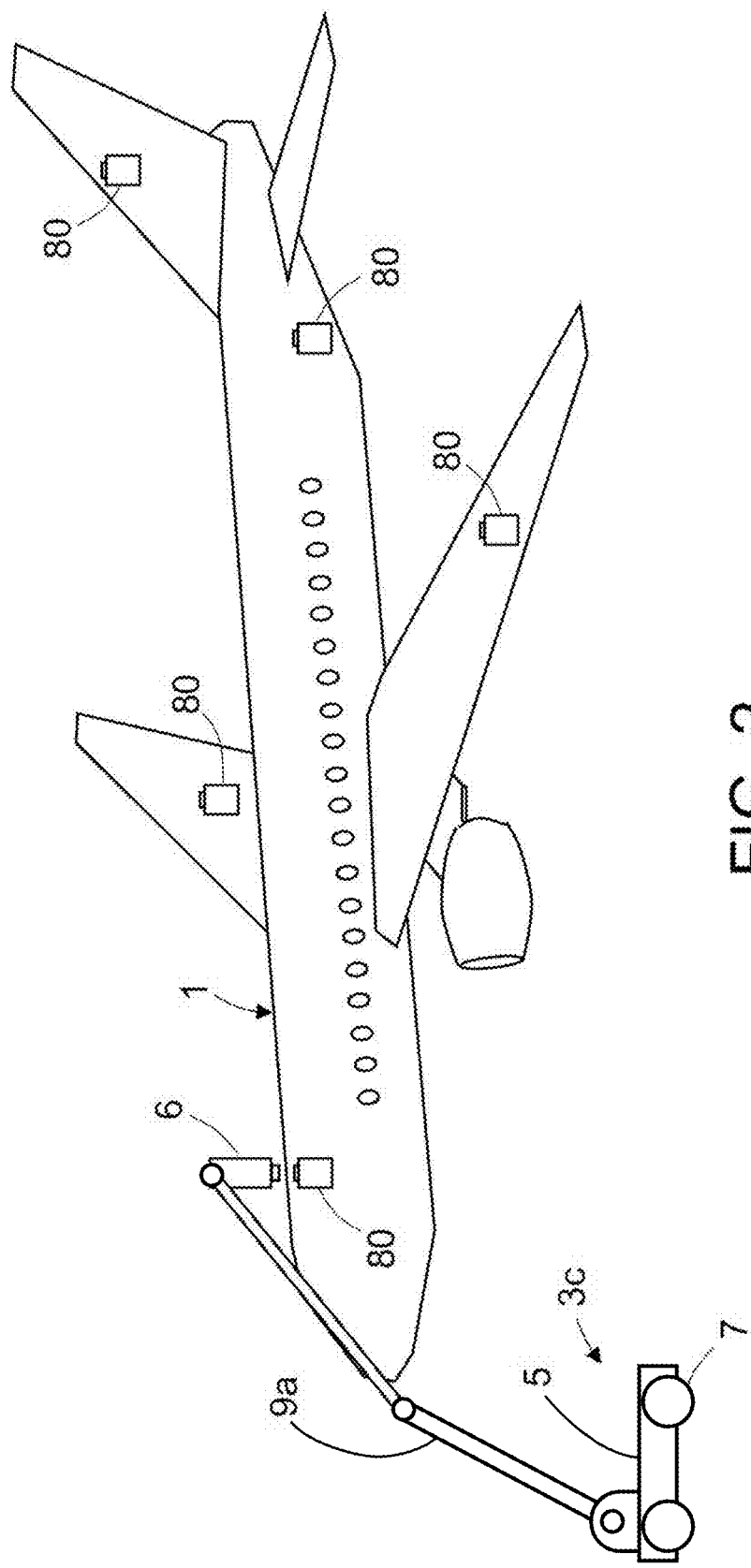
FIG. 2 is a diagram representing a view of a scenario in which a probe carried by a mobile robot is wirelessly coupled to a sub-surface sensor node of an aircraft on the ground. Multiple sensor nodes are shown as if the skin of the aircraft were optically transparent.

FIG. 2 is a diagram representing a view of a scenario in which a probe 6 carried by a motion platform 3c is wirelessly coupled to a sub-surface sensor node 80 of an aircraft 1 on the ground. Multiple sensor nodes 80 are shown as if the skin of the aircraft 1 were optically transparent. The motion platform 3c differs from the motion platform 3b depicted in FIG. 1 only in that motion platform 3c has an articulated arm 9a. The probe 6 carried by motion platform 3c may be positioned at successive positions on the external surface of the aircraft 1 which overlie or oppose transducers of respective sub-surface sensor nodes 80 to enable power and data transfer.

Figure 3:
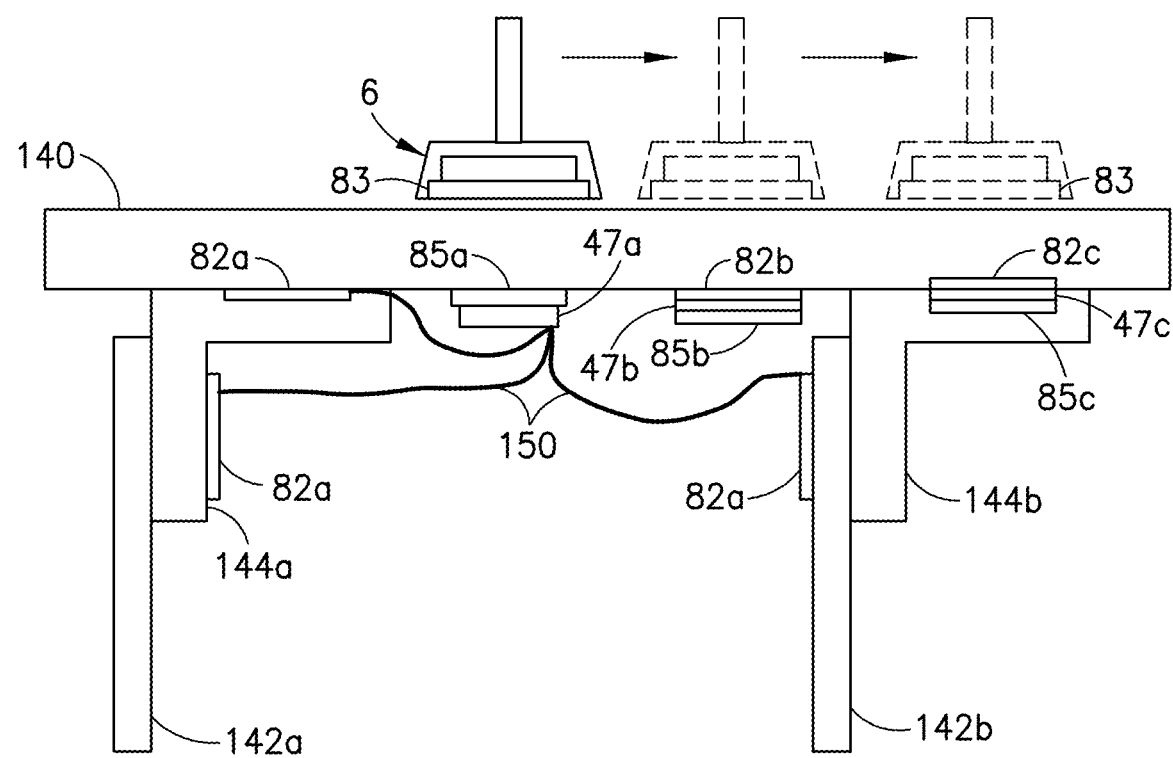
FIG. 3 is a diagram representing a side view of a probe that is aligned with respective sub-surface sensor nodes at successive positions, a first position of the probe being indicated by solid lines and subsequent positions of the probe being indicated by dashed lines.

FIG. 3 is a diagram representing a side view of a probe 6 having a transducer 83 that is aligned with transducers 85a-85c of respective sub-surface sensor nodes (not individually numbered in this view) at successive positions at different times. A first position of probe 6 is indicated by solid lines; second and third positions of probe 6 are indicated by dashed lines. The arrows respectively indicate probe movement from the first position to the second position and probe movement from the second position to the third position. The probe 6 is disposed above a skin 140 that is attached to a pair of ribs 142a and 142b by means of respective stringers 144a and 144b. The sensor nodes are disposed underneath the skin 140. Thus, skin 140 stands between probe 6 and the sensor nodes.

In the example depicted in FIG. 3, the first sensor node includes transducer 85a, a printed wiring board (hereinafter "PWB") 47a which is attached to the housing of transducer 85a, and three sensors 82a which are electrically connected to PWB 47a by respective wires 150. The second sensor node includes a sensor 82b which is attached to the undersurface of skin 140, a PWB 47b which is attached to sensor 82b, and a transducer 85b which is attached to PWB 47b. The third sensor node includes a sensor 82c which is embedded between skin 140 and stringer 144b, a PWB 47c which is attached to sensor 82c, and a transducer 85c which is attached to PWB 47c.

In accordance with the wireless coupling method proposed herein, transducer 83 is aligned with transducer 85a for a first time interval during which power and data are transferred between probe 6 and the first sensor node. Upon completion of power and data transfer with the first sensor node, the probe 6 is moved from the first position to the second position. Transducer 83 of probe 6 is then aligned with transducer 85b for a second time interval (subsequent to the first time interval) during which power and data are transferred between probe 6 and the second sensor node. Upon completion of power and data transfer with the second sensor node, the probe 6 is moved from the second position to the third position. Transducer 83 of probe 6 is aligned with transducer 85c for a third time interval (subsequent to the second time interval) during which power and data are transferred between probe 6 and the third sensor node.

Figure 4:
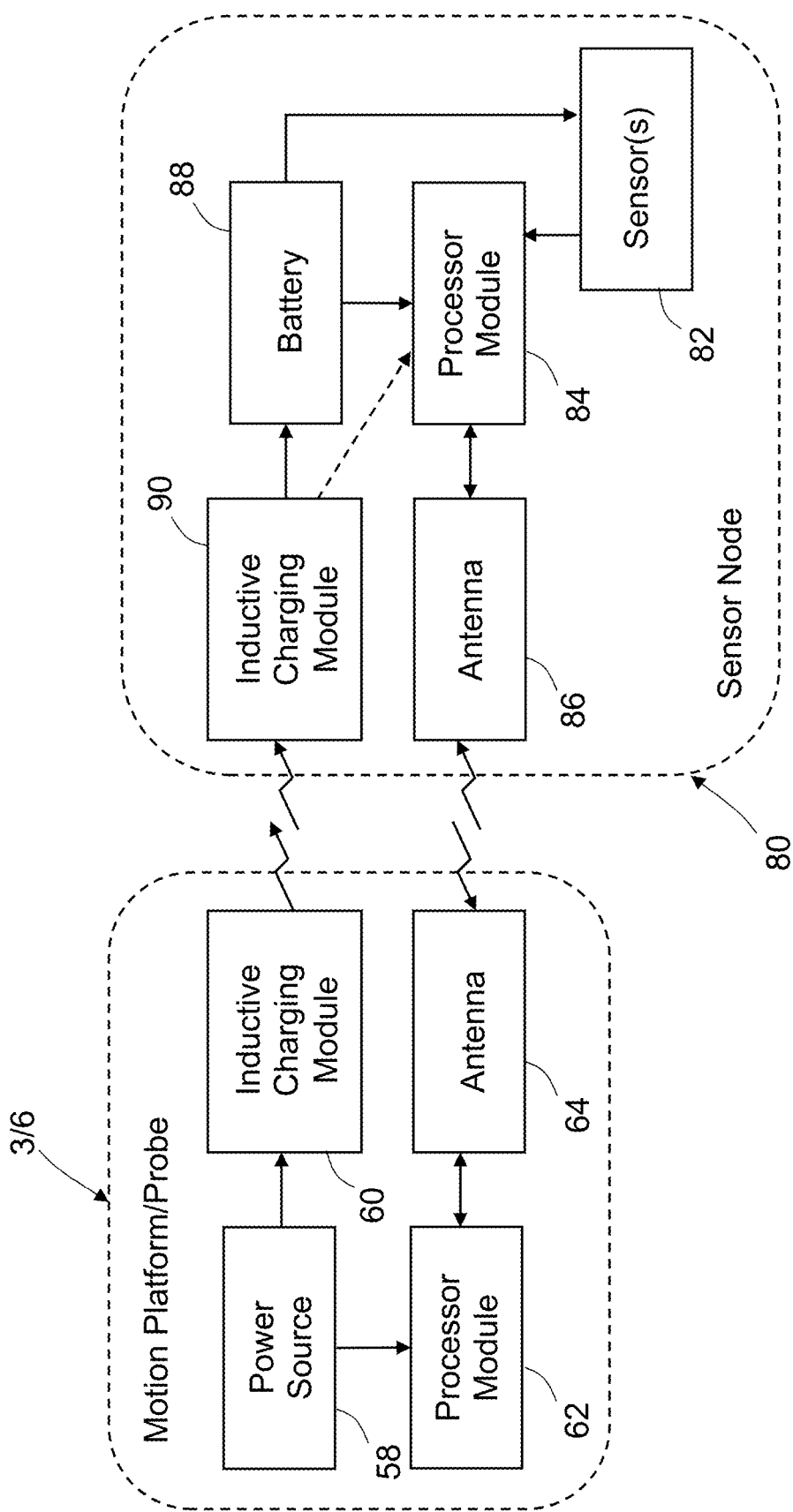
FIG. 4 is a block diagram identifying components of a sensor node and a probe-equipped motion platform having antennas and inductive charging modules in accordance with one embodiment.

FIG. 4 is a block diagram identifying components of a sensor node 80 and a probe-equipped motion platform 3. The probe 6 (attached to motion platform 3) includes a pair of transducers. One transducer is the coil of inductive charging module 60 and the other transducer is antenna 64. The power source 58 and the processor module 62 may be incorporated inside the probe 6 or separately mounted to the motion platform 3 and electrically connected to probe 6.

The sensor node 80 includes a battery 88 and an inductive charging module 90. The inductive charging module 90 includes a first transducer and inductive charging circuitry (e.g., alternating current components). The inductive charging module 90 is configured to convert alternating current induced in its transducer into direct current for charging the battery 88. The sensor node 80 further includes at least one sensor 82 and a processor module 84 which is configured to convert the output of sensor 82 into sensor data. Both the sensor 82 and the processor module 84 receive power from the battery 88. In some situations, it may be better to only use the inductive charging to power the RF transmission, which direct power supply is indicated by the dashed arrow that extends from inductive charging module 90 to processor module 84 in FIG. 4. The processor module 84 also includes on-board memory for data storage. The sensor node 80 further includes an antenna 86 that comprises a second transducer. The antenna 86 is connected to the processor module 84. The inductive charging module 90 and processor module 84 may be integrated into a common PWB or separate PWBs.

Still referring to FIG. 4, the motion platform 3 includes a power source 58, while the probe 6 includes an inductive charging module 60. The inductive charging module 60 includes a transducer and inductive charging circuitry (e.g., alternating current components). When probe 6 is properly positioned, the transducer of inductive charging module 60 is aligned with and wirelessly coupled to the transducer of inductive charging module 90. The probe 6 further includes an antenna 64, while the motion platform 3 further includes a processor module 62 which is connected to antenna 64. The processor module 62 also includes on-board memory for data storage. (In the alternative, the processor module 62 may be incorporated inside the probe 6.) The antenna 64 includes an open-loop wire that is wirelessly coupled to the open-loop wire of antenna 86. Both inductive charging module 60 and processor module 62 receive power from the power source 58. The inductive charging module 60 and processor module 62 may be integrated into a common PWB inside probe 6 or may be separate PWBs.

The inductive charging module 60 of probe 6 uses wireless power transfer to induce alternating current in the inductive coil (not shown) of the inductive charging module 90 of sensor node 80, a rectifier (not shown) of the charging module 90 converts the alternating current to direct current, which is then used to charge the battery 88. The processor module 84 of sensor node 80 is configured to send the sensor data to the processor module 62 onboard motion platform 3 via the antennas 86 and 64, which sensor data is stored in a non-transitory tangible computer-readable storage medium onboard motion platform 3.

Figure 5:
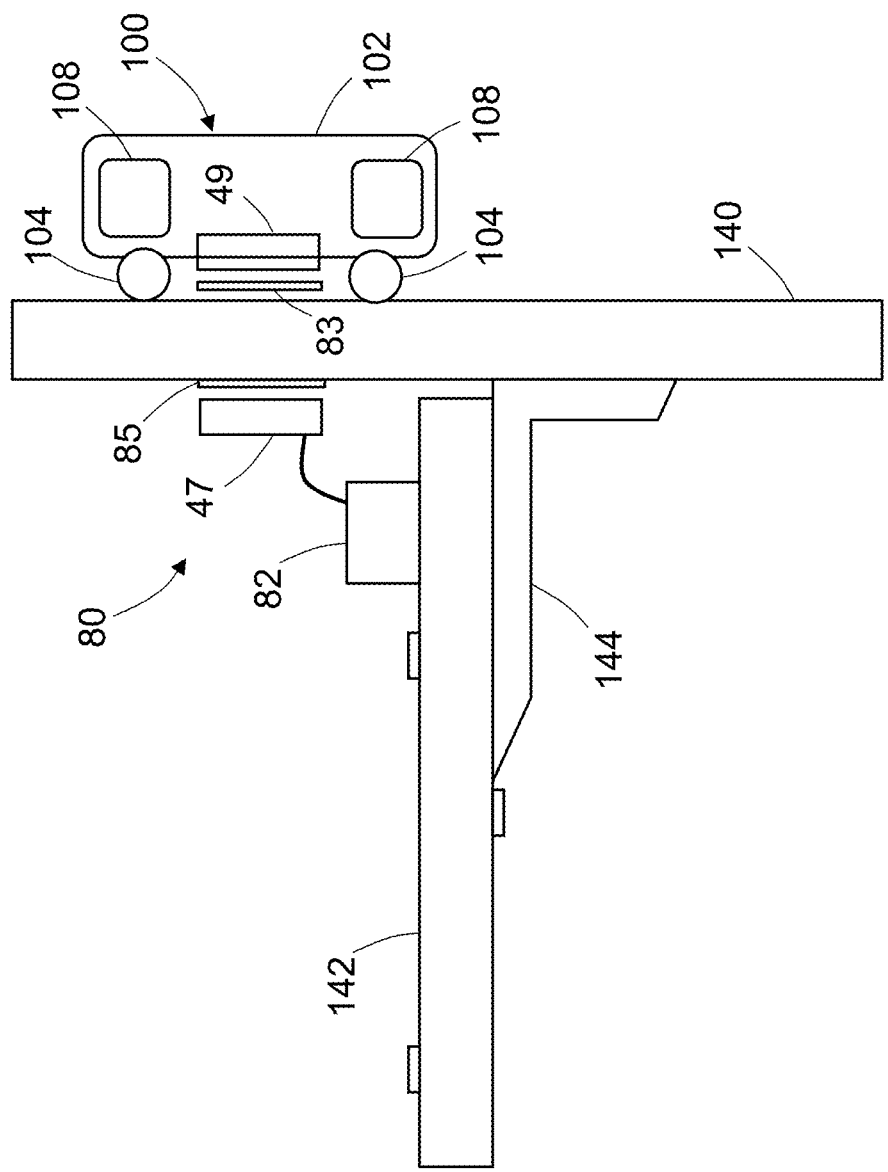
FIG. 5 is a diagram representing a side view of a crawler vehicle located on an external surface of a skin and carrying a probe which is aligned with a transducer of a sub-surface sensor node.

In accordance with an alternative embodiment, the motion platform may be a crawling robot capable of adhering to and moving across horizontal and vertical surfaces. FIG. 5 is a diagram representing a side view of a crawler vehicle 100 that is vacuum-adhered to and movable across an external surface of a skin 140. The skin 140 is attached to a rib 142 by means of a stringer 144. The sensor node 80 on one side of skin 140 includes a sensor 82 which is attached to rib 142, a PWB 49 which is electrically connected to sensor 82 by a wire, and a transducer 85 that is attached to the internal surface of skin 140. The PWB 49 may be internal or external to a probe housing that contains the transducer 85.

The crawler vehicle 100 includes a frame 102 and a plurality of Mecanum wheels 104 which are rotatably coupled to frame 102. The crawler vehicle 100 also includes a plurality of motors, such as stepper motors 108 mounted on frame 102, which drive rotation of Mecanum wheels 104. In the scenario depicted in FIG. 5, the Mecanum wheels 104 are in contact with an external surface of skin 140. The components for achieving floating vacuum adherence are not shown in FIG. 5 (but see FIGS. 9 and 10 discussed later).

In addition, the crawler vehicle 100 is equipped with a transducer 83 that is configured to transfer both power and data to the sensor node 80 (as will be described in detail later with reference to FIG. 18). Optionally, power and control signals may be provided to the crawler vehicle 100 via an umbilical cable (not shown in FIG. 5), which may also serve as a tether that is designed to arrest the descent of crawler vehicle 100 in the event that it slips off the target object.

In the scenario depicted in FIG. 5, the crawler vehicle 100 has navigated to a position where transducer 83 carried by crawler vehicle 100 is aligned with transducer 85 of sensor node 80. Various localization techniques for accomplishing transducer alignment are described in detail below. Preferably, the thickness of skin 140 is sufficiently small to allow transducers 83 and 85 to be within wireless coupling range to effect power and data transfer.

Figure 6:
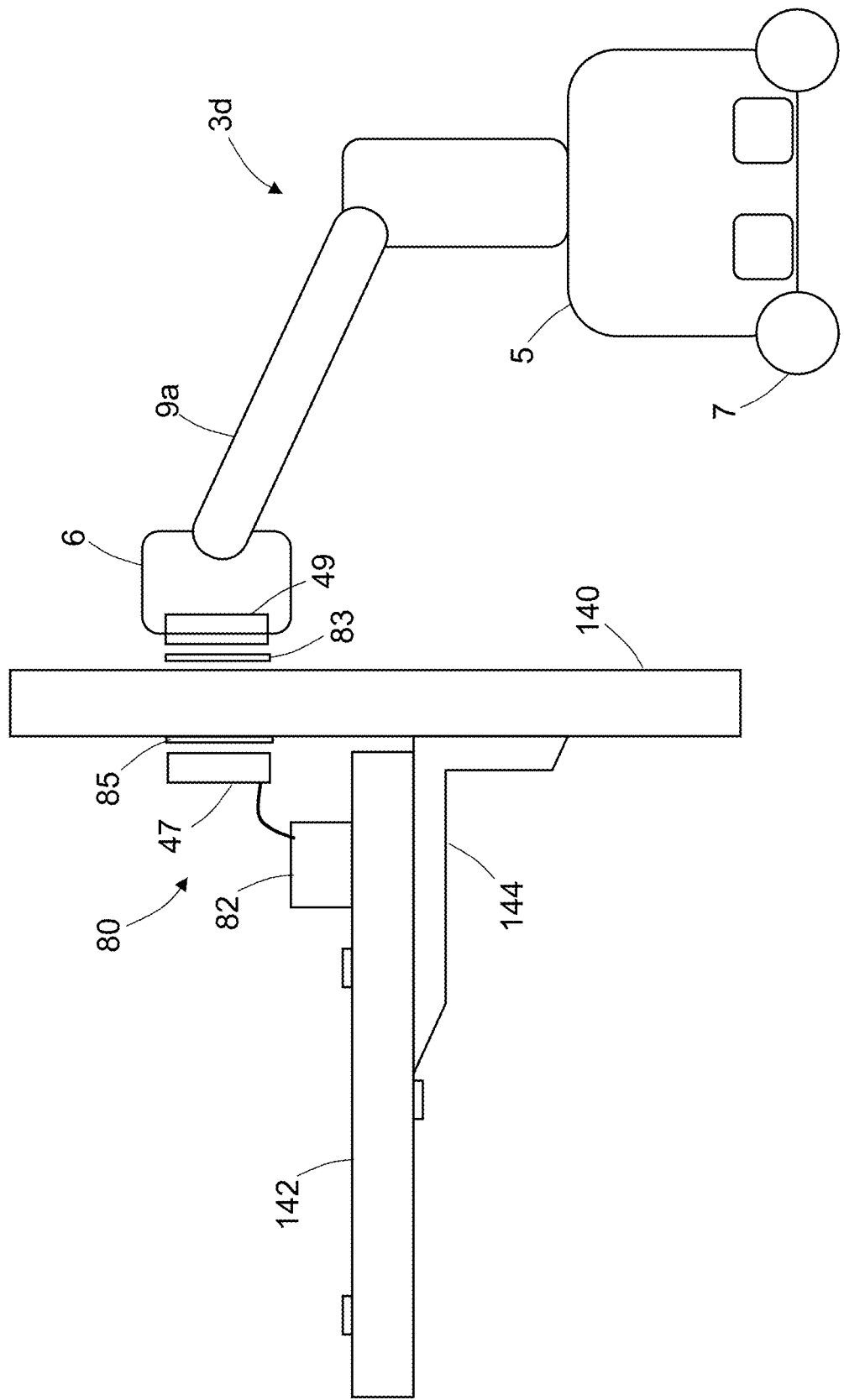
FIG. 6 is a diagram representing a side view of a motion platform carrying a probe which is aligned with a transducer of a sub-surface sensor node.

FIG. 6 is a diagram representing a side view of a motion platform 3d carrying a probe 6 having a transducer 83 which is aligned with a transducer 85 of a sub-surface sensor node 80. The sensor node components depicted in FIG. 6 are the same as those shown in FIG. 5. The motion platform 3d includes a mobile base 5, a plurality of wheels 7 rotatably coupled to the mobile base 5, and an articulated arm 9a. In addition, the motion platform 3d is equipped with a probe 6 that is mounted to a distal end of the articulated arm 9a. The transducer 83 may be used to transfer power and data to/from the sensor node 80. In the example depicted, the transducer 83 is connected to a PWB 49. The PWB 49 may be internal or external to the probe housing.

In the scenario depicted in FIG. 6, the motion platform 3d has navigated to a position where an articulated arm 9a is able to align the position of transducer 83 with transducer 85 of sensor node 80. Transducer alignment may be achieved using any one of the localization techniques described in detail below. The system is designed so that when transducers 83 and 85 are aligned and on opposite sides of skin 140, the wireless transfer of power, data, and instructions is enabled.

In accordance with other embodiments, the automated motion platform is an unmanned aerial vehicle (UAV). The UAVs disclosed herein include a controller which preferably takes the form of a plurality of rotor motor controllers that communicate with an onboard computer system configured to coordinate the respective rotations of the rotors. In accordance with one embodiment, the controller is configured (e.g., programmed) to control the rotors in accordance with flight guidance received from a 3-D localization system that tracks the location of the UAV relative to the target environment. The target destination of the UAV may be a location where a plurality of standoff contact elements of the UAV contact the surface of the structure to be measured. Once the standoff contact elements are in contact with the surface of the structure, the controller may activate surface attachment devices (e.g., vacuum adherence devices) to maintain the UAV stationary at the location with the standoff contact elements abutting the surface.

After the UAV lands on the approximate location of the sensor node, it still needs to find the actual location of the inductive coil/antenna. This will require the probe module to move around on the surface to find the proper location. There are two possibilities for this: (1) the entire UAV can move around (skim across) the surface while collecting signal strength data; or (2) small actuators within the probe module move the probe around the surface to find the proper location for power/data transfer while the rest of the UAV stays stationary. Then probe 6 carried by the UAV 2 (see FIG. 1) is activated to perform power and data transfer operations. Upon completion of the power and data transfer procedure, the UAV 2 releases the surface attachment devices and lifts offs from the surface, again using reorientation and speed changes on a subset of the rotors.

Figure 7:
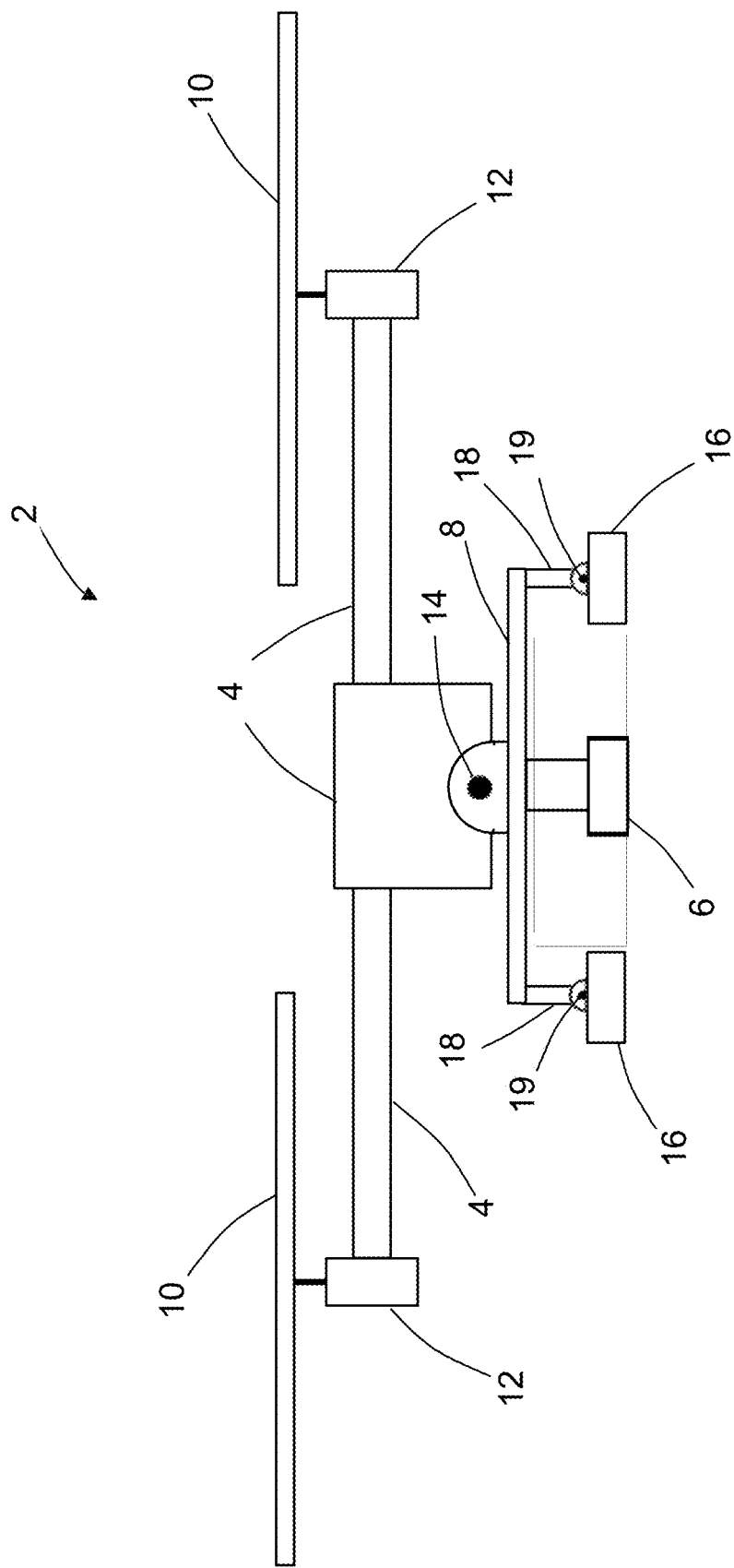
FIG. 7 is a diagram representing a side view of a probe-carrying UAV in accordance with one embodiment.

FIG. 7 is a diagram representing a side view of a UAV 2 carrying a probe 6 in accordance with one embodiment. The UAV 2 includes a UAV body frame 4, a plurality of rotor motors 12 mounted to UAV body frame 4, and a plurality of rotors 10 respectively operatively coupled to the plurality of rotor motors 12. In addition, the UAV 2 includes a probe support frame 8 pivotably coupled to the UAV body frame 4 by means of a gimbal pivot 14. The probe support frame 8 includes a plurality of (at least three) standoff support members 18. A respective standoff contact foot 16 is coupled to the distal end of each standoff support member 18. In one proposed implementation, the standoff contact feet 16 are made of compliant (e.g., elastomeric) material. The standoff support members 18 and standoff contact feet 16 form a standoff system that maintains the probe 6 in a standoff position relative to the surface overlying the sensor node.

Figure 8A:
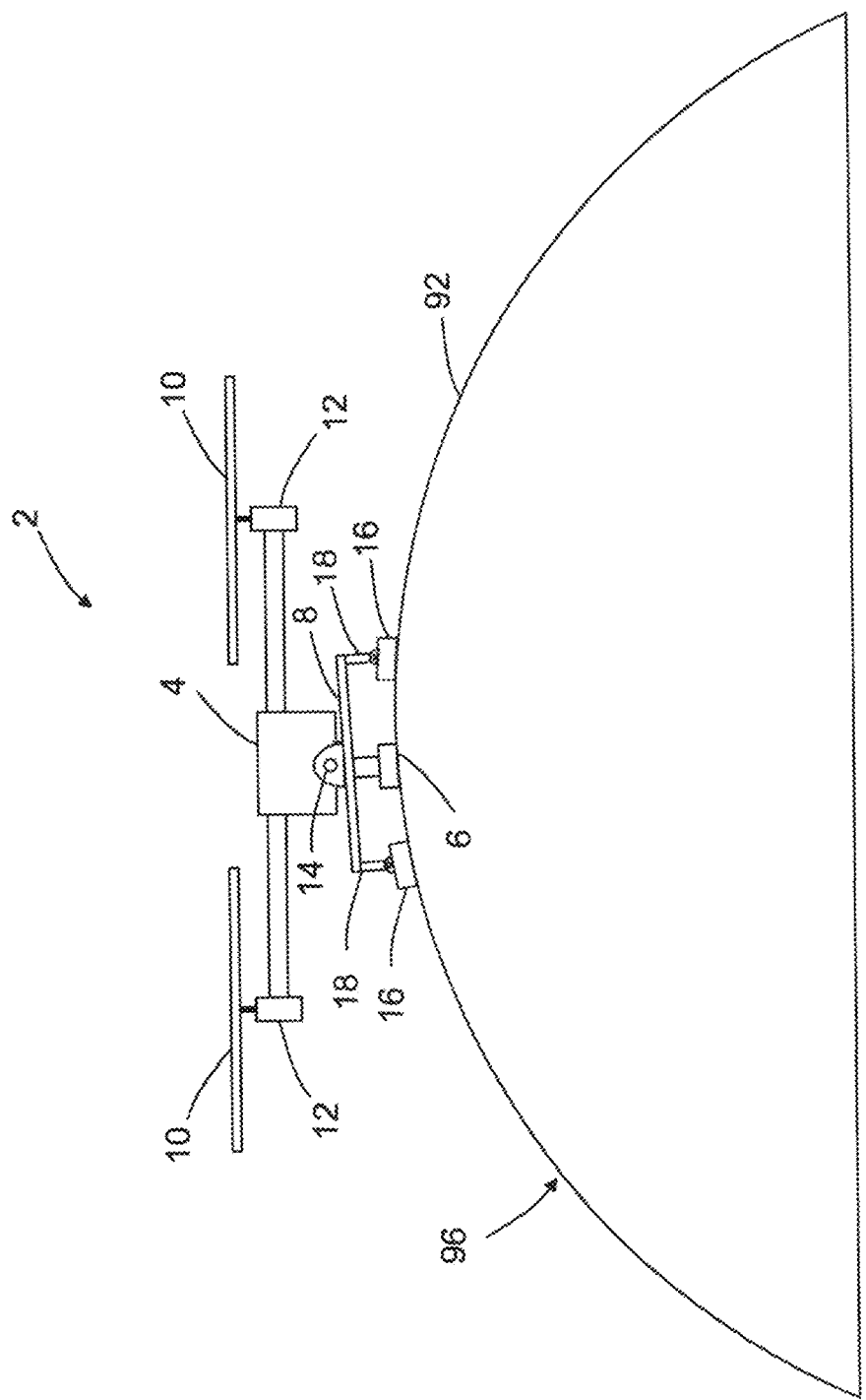
FIG. 8A is a diagram representing a side view of the probe-carrying UAV depicted in FIG. 7 after landing on a structure having a rounded surface, such as an aircraft fuselage or a storage tank.
Figure 8B:
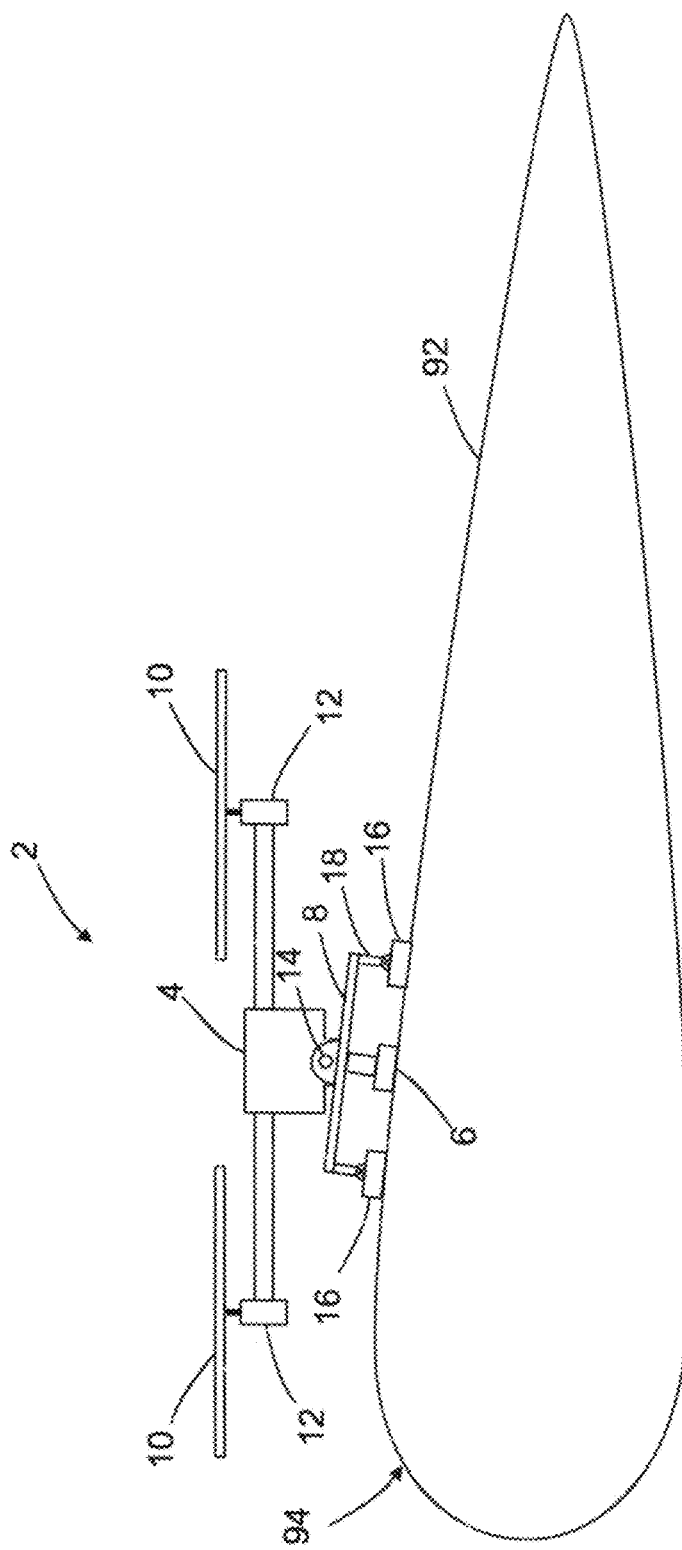
FIG. 8B is a diagram representing a side view of the probe-carrying UAV depicted in FIG. 7 after landing on an airfoil-shaped body, such as an aircraft wing or a wind turbine blade.

In accordance with the embodiment depicted in FIG. 7, the standoff contact feet 16 are pivotably coupled to the distal ends of the standoff support members 18 by means of respective pivots 19. The pivotable coupling enables the standoff contact feet 16 to adjust their orientations so that the feet lie flat on curved surfaces. FIG. 8A shows the probe-carrying UAV 2 after landing on a target object 96 having a surface 92, such as the surface of an aircraft fuselage or the curved regions of a storage tank. FIG. 8B shows the same UAV 2 after landing on a surface 92 of an airfoil-shaped body 94, such as an aircraft wing or a wind turbine blade. In both scenarios, each standoff contact foot 16 is able to reorient to sit flat on the surface 92. While in contact with the surface, the UAV 2 may be controlled to skim across the surface to a target position where the probe 6 is aligned and wirelessly coupled to the transducer of a target sub-surface sensor node.

Figure 9:
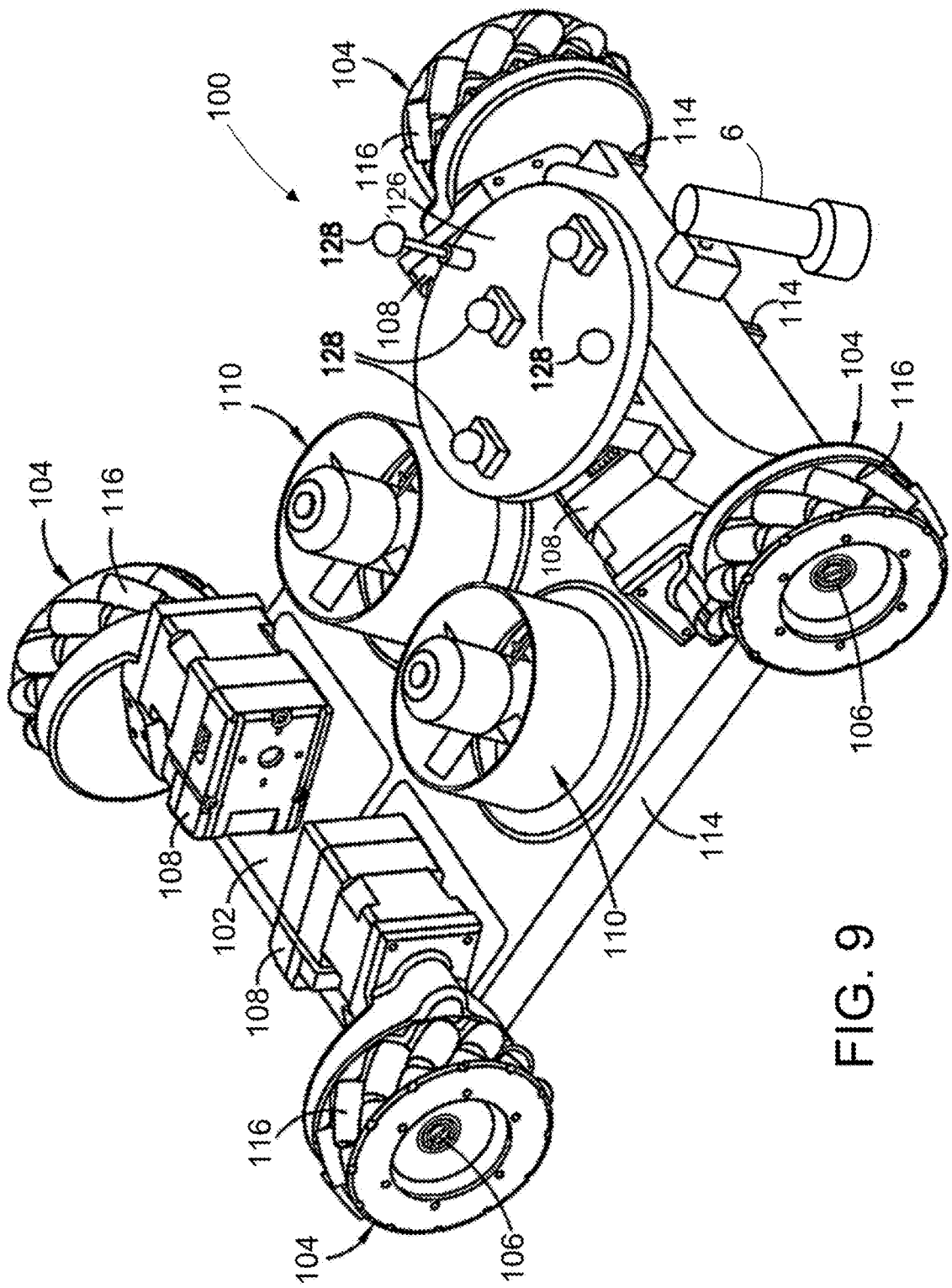
FIG. 9 is a diagram representing a 3-D view of parts of a holonomic-motion crawler vehicle having two suction zones in accordance with one embodiment. The electrical connections for supplying signals for controlling operation of the depicted components and other components are not shown.

In accordance with alternative embodiments, wireless power and data transfer with a sub-surface sensor node may be achieved using an automated motion platform in the form of a mobile robot having tracks or wheels (hereinafter "crawler vehicle"). FIG. 9 shows portions of a crawler vehicle 100 that is equipped with a probe 6. The crawler vehicle 100 comprises a frame 102 and a plurality of wheels rotatably coupled to the frame 102. In the example depicted in FIG. 9, the crawler vehicle 100 is capable of holonomic motion and the wheels are Mecanum wheels 104.

A holonomic motion system is one that is not subject to motion constraints and can translate in any direction while simultaneously rotating. The holonomic-motion crawler vehicle disclosed in detail hereinafter can move on horizontal surfaces and can climb vertical surfaces. This combination of capabilities can be achieved by using a suction generation system that equalizes or evenly distributes the normal loads on the Mecanum wheels 104 so that the lateral forces needed by the wheels can be generated. The motion of the resulting platform can be controlled to enable general-purpose positioning for precise motion control of the position of probe 6. In alternative embodiments, omni wheels can be employed in place of Mecanum wheels and the surface attraction capability of the crawler vehicle 100 may be based on magnetic or electrostatic sources of attraction instead of suction.

Figure 10:
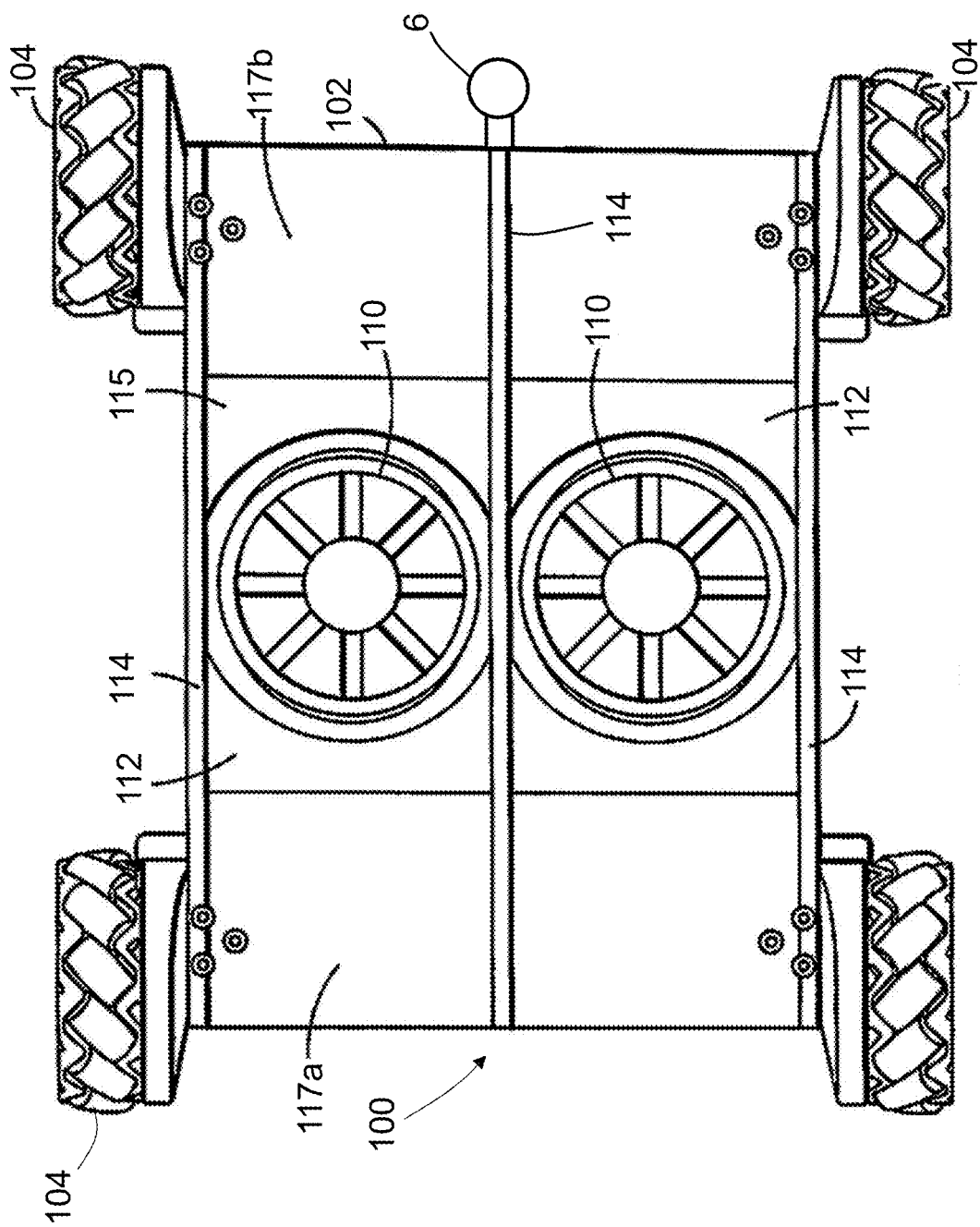
FIG. 10 is a diagram representing a bottom view of a holonomic-motion crawler vehicle having two suction zones in accordance with the embodiment depicted in FIG. 2.

The crawler vehicle 100 shown in FIG. 9 has two low-pressure (e.g., suction) zones (not visible in FIG. 9, but see suction zones 112 in FIG. 10). The electrical connections for supplying signals for controlling operation of the depicted components are not shown. This holonomic-motion platform comprises a frame 102 with four Mecanum wheels 104 (two type "A" and two type "B" Mecanum wheels) mounted to the frame 102 by means of respective axles 106, and further comprises four independently controlled stepper motors 108 (one per Mecanum wheel 104). Each Mecanum wheel 104 has a multiplicity of tapered rollers 116 rotatably mounted to its circumference, each roller 116 being freely rotatable about its axis. In one embodiment these rollers 116 have an axis of rotation which lies at a 45-degree angle with respect to the plane of the Mecanum wheel 104. The crawler vehicle 100 can be made to move in any direction and turn by varying the speed and direction of rotation of each Mecanum wheel 104.

The embodiment depicted in FIG. 9 also has two suction devices arranged side by side in the middle of the frame 102, midway between the front and rear wheels. Each suction device may be a respective electric ducted fan 110 which is mounted in a respective opening (not shown in FIG. 9) formed in the frame 102. Each electric ducted fan 110 comprises a fan which is rotatable about an axis, a duct surrounding the fan, and an electric motor which drives the fan to rotate in a direction such that air is propelled from a respective channel or space underneath the frame (hereinafter "suction zone") up through the fan duct, thereby creating suction in the corresponding suction zone. The two suction zones are bounded on opposing sides by longitudinal low-surface-friction flexible skirts 114 which are attached to the frame 102, the middle skirt forming a common boundary wall separating the two suction zones. The skirts 114 may extend downward so that their bottom edges contact the surface on which the vehicle is moving.

Although not shown in FIG. 9, the crawler vehicle 100 can be tethered to a support system by a cable which supplies electrical power to the stepper motors 108 and electric ducted fans 110 on the vehicle. The cable also provides control signals from a controller (e.g., a computer) which controls the operation of probe 6, stepper motors 108 (for rotating the Mecanum wheels 104), and electric ducted fans 110. The crawler vehicle 100 further comprises a converter box (not shown) mounted to the frame 102. The converter box converts USB signals from the controller (not shown) into pulse-width-modulated (PWM) signals for controlling the electric ducted fan motors (not shown in FIG. 9).

In accordance with an alternative embodiment, the crawler vehicle 100 could be battery-powered, instead of receiving electrical power via a tether cable. Also the motor controller could be a microprocessor or microcomputer mounted onboard the crawler vehicle, rather than using a ground-based computer to control the vehicle by means of controls signals carried by the tether cable. Alternatively, the motors onboard the crawler vehicle can be controlled via a wireless connection to an off-board controller.

FIG. 10 shows a bottom view of the crawler vehicle 100 depicted in FIG. 9. The underside of the frame 102 is shaped to provide two suction zones 112 that can be controlled independently. (In alternative embodiments, more than two suction zones can be employed.) The crawler vehicle depicted in FIG. 10 further comprises low-surface-friction skirts 114 that conform to non-flat surfaces, including a central common skirt which bisects the bottom surface of the frame along a longitudinal axis. Each electric ducted fan 110 is installed in a respective opening in the frame and is in fluid communication with a respective suction zone 112 defined by the frame bottom surface and the skirts 114. When the fans 110 are turned on, each fan propels air upward, thereby sucking air from the shaped suction zones 112.

In the particular construction depicted in FIG. 10, the upper half of the bottom surface between the uppermost and middle skirts 114 comprises a flat central surface 115 having an opening in which the fan of the electric ducted fan is installed. This flat central surface 115 is flanked by forward and rearward convex surface 117a and 117b. Each convex surface 117a and 117b may be an aerodynamically streamlined surface which forms a respective throat with opposing portions of the surface on which the crawler vehicle 100 is moving. Thus, the contoured bottom surface of the frame 102, the skirts 114 and the surface on which the crawler vehicle 100 is moving define respective channels that allow sufficient air to be sucked up through the corresponding electric ducted fan 110 to generate a desired suction force. The portion of each channel between the lowest points of the convex surfaces 117a and 117b forms a respective suction zone 112.

The movement of the crawler vehicle 100 can be tracked and controlled using a motion capture system of the type disclosed in U.S. Pat. No. 7,643,893. In the embodiment depicted in FIG. 9, the crawler vehicle 100 is equipped with a marker platform 126 (e.g., a rigid disk) that carries a plurality of passive retro-reflective markers 128 arranged in a unique pattern for tracking by a motion capture system. The presence of these retro-reflective markers 128 allows the crawler vehicle 100 to be tracked and controlled using a motion capture system. Each object to be tracked using a motion capture system should have at least three passive retro-reflective markers attached thereto. In the proposed implementation shown in FIG. 9, the crawler vehicle 100 has five retro-reflective markers 128.

Figure 11:
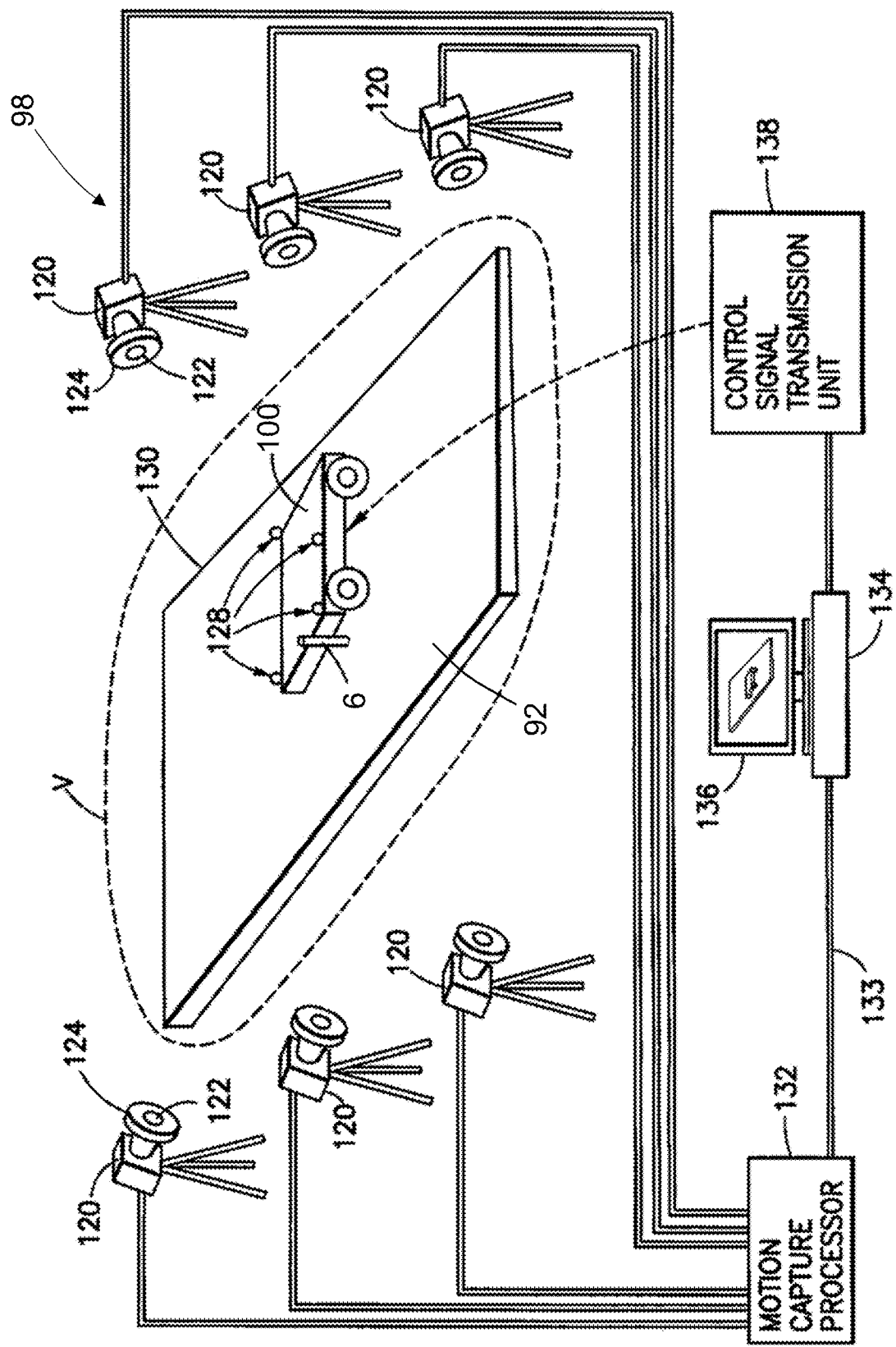
FIG. 11 is a hybrid diagram that includes a 3-D view of some portions of a motion capture and control system in accordance with one embodiment which is suitable for tracking the location of a crawler vehicle. Other portions of the motion capture and control system are represented in a block diagram format.

A motion capture system 98 in accordance with one embodiment is shown in FIG. 11. A crawler vehicle 100—carrying a probe 6 and four retro-reflective markers 128 arranged in a unique pattern—can be tracked using multiple off-board cameras 120 as crawler vehicle 100 travels over a surface 92 (e.g., of a wing 130 of an airplane). The motion capture system 98 shown in FIG. 11 has a motion capture processor 132 which collects real-time image information from all instances of the motion capture cameras 120, processes the data, and sends the processed data along a dedicated or network connection to a crawler navigation and control computer 134. The position and orientation of the crawler vehicle 100 are controlled by the crawler navigation and control computer 134 via a control signal transmission unit 138 and a wired or wireless control link (indicated by the dashed arrow).

Processes for calibrating the motion capture system 98 shown in FIG. 11 to a reference coordinate system and then continuously motion capture tracking the location of the marker pattern relative to the reference coordinate system are disclosed in U.S. Pat. No. 8,892,252. The information for defining the pattern of retro-reflective markers 128 mounted on crawler vehicle 100 is stored in the motion capture processor 132. The retro-reflective markers 128 may comprise a plurality of small spheres (e.g., about ¼ inch in diameter) attached to the marker platform 126, as better seen in FIG. 9. The position of the center of the probe 6 relative to the marker pattern can be determined by calculating an offset position in the coordinate system of the crawler vehicle 100. These offsets can be used to calculate a transformation matrix for converting the coordinates of the retro-reflective markers 128 into the coordinates of the center of probe 6. The result is that the position of the probe 6 can be defined as a function of the position and orientation of the marker pattern in the reference coordinate system (i.e., the coordinate system of the target object).

Still referring to FIG. 11, each motion capture camera 120 can be a video camera of the type comprising a ring of LEDs 124 surrounding a camera lens 122. In conjunction with such cameras, each retro-reflective marker 128 may comprise a hemispherical or ball-shaped body coated with reflective material that reflects impinging light from the LEDs 124 of each camera 120 back toward the associated lens 122 of the respective camera in a well-known manner. The motion capture system utilizes data captured from image sensors inside the cameras 120 to triangulate the three-dimensional (3-D) position of the crawler vehicle between multiple cameras configured to provide overlapping projections.

The outputs from cameras 120 are input to respective ports of the motion capture processor 132. The motion capture processor 132 collects real-time image information from all of the motion capture cameras 120, processes the image data, and sends the information along a dedicated connection to the crawler navigation and control computer 134. The display monitor 136 may be used to display three-dimensional position data for the markers and the position and orientation data of the tracked objects computed by the motion capture processor 132.

At each frame update, the positions of all retro-reflective markers 128 in capture volume V (indicated by a dashed closed contour in FIG. 11) can be captured by each camera 120 and converted by the motion capture processor 132 into 3-D coordinates, which are then associated with the known marker pattern for the tracked crawler vehicle 100, resulting in full 6-degree-of-freedom position and orientation representations for the tracked crawler vehicle. The coordinates of the crawler vehicle 100 are then transformed into the coordinates of the center of probe 6 by the motion capture processor 132. A separate data conversion application running on crawler navigation and control computer 134 accesses this probe location data through a network socket connection 133 to the motion capture processor 132.

The crawler navigation and control computer 134 runs closed-loop feedback control software and operatively communicates with the crawler vehicle 100 via a communication link (indicated by a curved dashed arrow in FIG. 11). The crawler navigation and control computer 134 is also programmed to run a command and control software program that performs a variety of functions associated with monitoring and controlling the crawler vehicle 100 and the other components of the motion capture system. In operation, the crawler navigation and control computer 134 causes appropriate command signals to be transmitted to the crawler vehicle 100 by the control signal transmission unit 138, directing the crawler vehicle 100 to execute desired maneuvers and operations.

During movement of the crawler vehicle 100 within the capture volume V, the motion capture system tracks the positions of the retro-reflective markers 128 on the crawler vehicle 100 and generates a representation of the position and orientation (e.g., quaternion or 4×4 homogeneous transformation matrix) of the group of retro-reflective markers 128. The command and control software running on the crawler navigation and control computer 134 compares the position and orientation feedback information with the desired position and orientation of the crawler vehicle 100, determines the desired actuator inputs for controlling the movement of the crawler vehicle 100, and causes appropriate command signals to be transmitted to the crawler vehicle 100 via control signal transmission unit 138 and the communication link to controllably adjust (or maintain) the position, heading and velocity of the crawler vehicle 100. Thus, the motion capture system provides the control system with position and orientation information for a closed-loop feedback control capability for adjusting the positions and movements of the crawler vehicle 100.

The method for providing guidance to a motion platform using the motion capture system depicted in FIG. 11 includes the following steps: (a) attaching retro-reflective markers to the motion platform; (b) capturing images of the motion platform adjacent to the external surface of the skin using a motion capture system; (c) processing the captured images to calculate an estimated current position of the transducer onboard the motion platform in the 3-D coordinate system of the target object; (d) calculating a difference of the estimated current position and the estimated target position of the transducer onboard the motion platform; and (e) controlling movement of the motion platform in a manner that reduces the difference.

In accordance with an alternative embodiment, the cameras could be mounted to multiple UAVs that fly, or are flown, to specific locations (or perches) in the environment and attach themselves to the environment using suction, grippers, or magnetic attachment devices. This reconfigurable system would them be calibrated using yet another UAV carrying a calibration object (retro-reflective markers attached to a structure in a known configuration), which is flown through the capture volume V for the calibration procedure. Once calibrated, this system would function in the same way as the stationary camera system. When the robotic data acquisition and/or charging tasks are complete, the motion capture camera-carrying UAVs would be instructed to leave their perches and return to the base.

Figure 12:
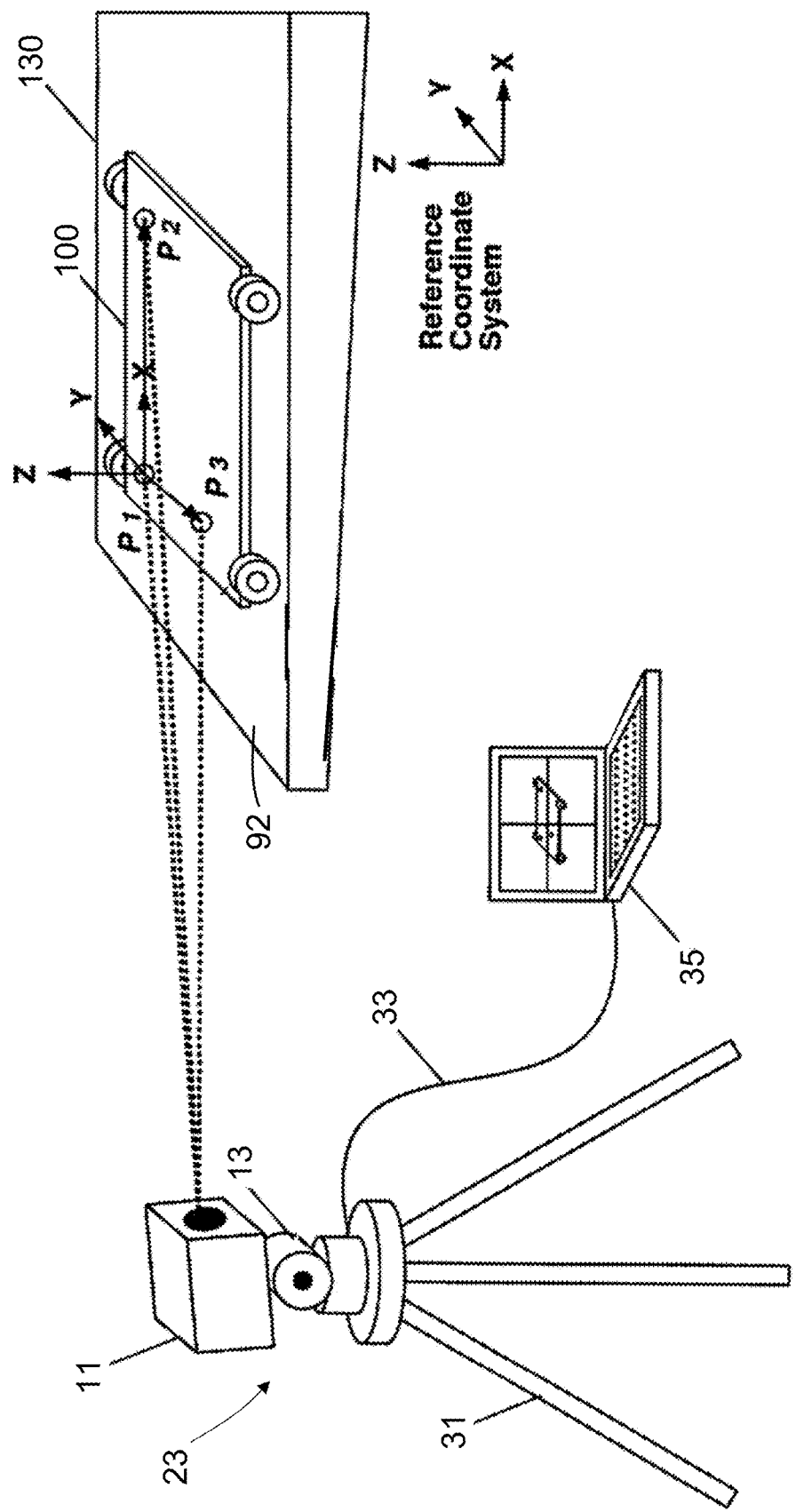
FIG. 12 is a diagram representing a 3-D view of a system for tracking and controlling the motion of a crawler vehicle using a local positioning system (LPS) in accordance with one transducer configuration.

FIG. 12 is a diagram representing a 3-D view of a system for tracking and controlling the motion of a crawler vehicle using a local positioning system 23 (hereinafter "LPS 23") in accordance with one embodiment. The tracking method is an automated process that incorporates active lights on the target object (e.g. crawler vehicle) and image processing to compute the target object position and orientation. The tracking method uses an LPS 23 that includes a video camera 11 and a laser range meter mounted to a controllable pan-tilt unit 13. The LPS operation and calibration process is disclosed in U.S. Pat. No. 7,859,655. More specifically, the video camera 11 may have automated (remotely controlled) zoom capabilities. The video camera 11 may additionally include an integral crosshair generator to facilitate precise locating of a point within an optical image field display of the video camera 11. The video camera 11 and pan-tilt unit 13 may communicate with a computer 35 through a video/control cable 33. Alternatively, a wireless communication pathway may be employed. The pan and tilt angles of the pan-tilt unit 13 and, therefore, the orientation of the video camera 11 can be controlled using the keyboard of computer 35 or other input device. The optical image field, with crosshair overlay, as sighted by the video camera 11, can be displayed on the monitor of computer 35.

The pan-tilt unit 13 is controlled to rotationally adjust the video camera 11 to selected angles around a vertical, azimuth (pan) axis and a horizontal, elevation (tilt) axis. A direction vector that describes the orientation of the camera relative to the fixed coordinate system of the tripod 31 (or other platform on which the pan-tilt unit is attached) is determined from the pan and tilt angles, as well as the position of the center of the crosshair marker in the optical field when the camera is aimed at a point of interest.

A laser range meter (not shown in FIG. 12) may be incorporated inside or mounted on the outside of the housing of camera 11 in such a way that it transmits a laser beam along a direction vector. The laser range meter is configured to measure distances to the target object. The laser range meter may have a laser and a central processing unit configured to compute distances based on the time-of-flight of laser light reflected by the target object.

The LPS 23 shown in FIG. 12 further comprises three-dimensional (3-D) localization software which is loaded into computer 35. For example, the 3-D localization software may be of a type that uses multiple calibration points on the target object to define the location (position and orientation) of video camera 11 relative to the target object in a well-known manner. The calibration points may be visible features of known position in the local coordinate system of the target object as determined from a three-dimensional database of feature positions (e.g., a CAD model) or other measurement technique. The three-dimensional localization software utilizes the X, Y, Z data of the calibration points and the pan and tilt data from the pan-tilt unit 13 and distance data from the laser range meter to define the relative position and orientation of the video camera 11 with respect to the local coordinate system of the target object. The measured distances to the calibration points may be used in coordination with the pan and tilt angles from the pan-tilt unit 13 to solve for the camera position and orientation relative to the target object. A method for generating an instrument-to-target calibration transformation matrix (sometimes referred to as the camera pose) is disclosed in U.S. Pat. No. 7,859,655. Using the known and measured data, the calibration process computes the 4×4 homogeneous transformation matrix that defines the position and orientation of the camera relative to the target object.

Once the position and orientation of the video camera 11 with respect to the target object have been determined and a camera pose transformation matrix has been generated, camera pan data (angle of rotation of the video camera 11 about the azimuth axis), tilt data (angle of rotation of the video camera 11 about the elevation axis), and distance data from the laser range meter may be used in conjunction with the calculated position and orientation of the video camera 11 to determine the X, Y and Z coordinates of any point of interest on the target object in the coordinate system of the target object. One such point of interest is a point on the external surface of the target object which is aligned with the center of a transducer of a sub-surface sensor node.

The foregoing localization and motion tracking processes can be extended and applied in an analogous manner to determine the X, Y and Z coordinates of any point of interest on a target object in an absolute (reference) coordinate system. For example, as depicted in FIG. 12, a local positioning system can be used to track the motion of a crawler vehicle 100 which is moving on a surface 92 of a wing 130 of an airplane in the reference coordinate system of the airplane. More specifically, the LPS 23 can track the location of the origin of the crawler vehicle coordinate system in the reference coordinate system of the airplane. The origin of the crawler vehicle coordinate system can be defined anywhere on the crawler vehicle (or other target object). In FIG. 12, the crawler vehicle coordinate system origin is shown to be at a point P1 having known coordinates in the frame of reference of the crawler vehicle 100, where a first retroreflective marker may be attached to the crawler vehicle 100. Second and third retroreflective markers may be attached at points P2 and P3 having known coordinates in the frame of reference of the crawler vehicle 100. Thus, the LPS 23 is capable of determining the position and orientation of the crawler vehicle 100 in the frame of reference of the airplane.

Figure 13:
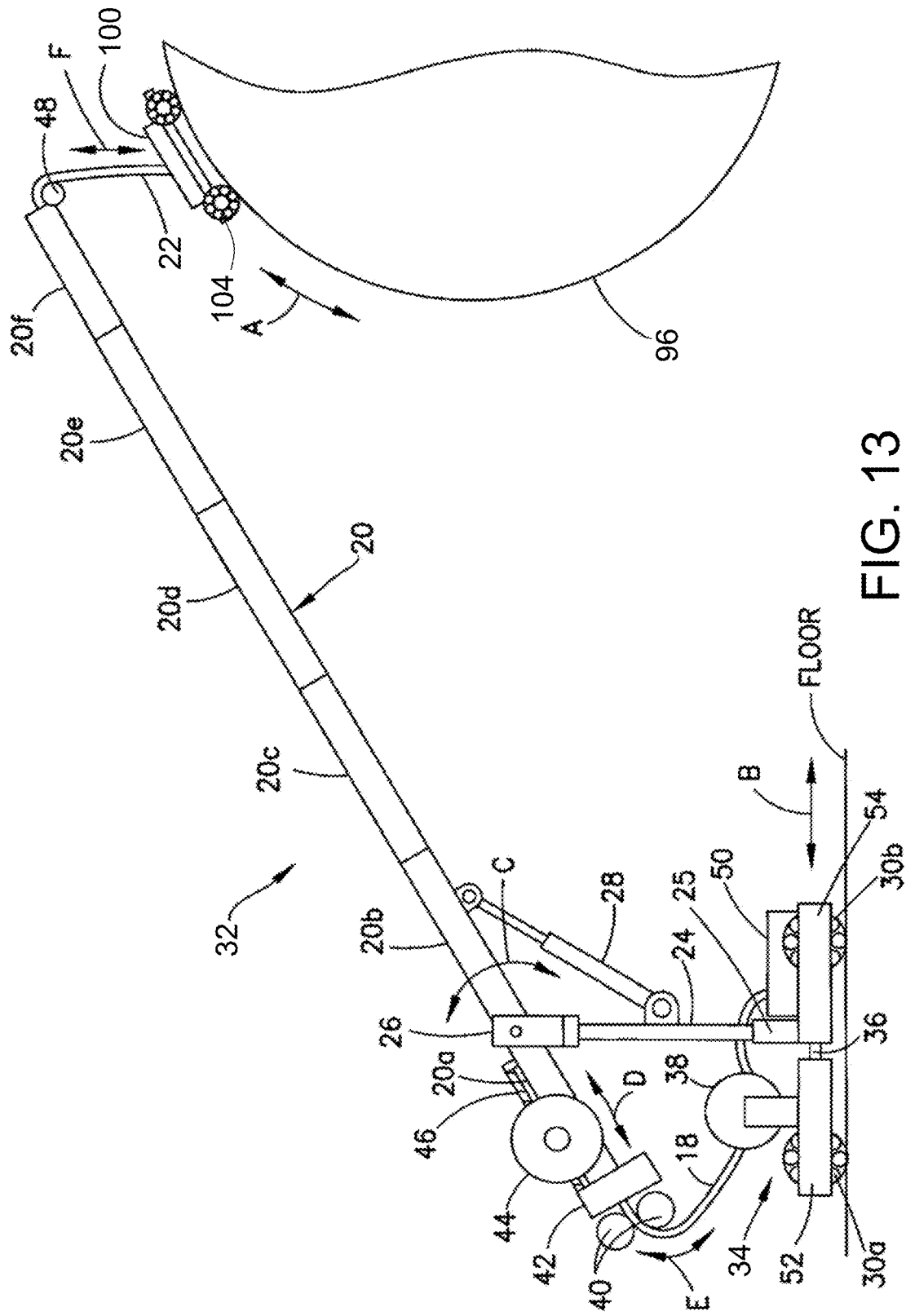
FIG. 13 is a diagram representing an elevational view showing the configuration of a mobile boom system for managing an umbilical cable in accordance with one embodiment.

As previously mentioned, each crawler vehicle may be tethered by an umbilical cable. FIG. 13 shows a configuration of a mobile boom system for managing an umbilical cable 22 in accordance with one embodiment. The umbilical cable 22 is connected to a crawler vehicle 100 located on a surface of a target object 96 (e.g., an airplane). The crawler vehicle 100 may be a holonomic-motion robotic crawler capable of motion in any direction on a surface. As one example, the double-headed arrow A in FIG. 13 represents motion of the crawler vehicle 100 along the surface of target object 96. The crawler vehicle 100 may comprise Mecanum wheels for enabling holonomic motion and suction zones for holding the robotic crawler against a vertical surface, as described above with reference to FIGS. 9 and 10. Although not visible in FIG. 13, the crawler vehicle 100 includes a probe of one of the types described herein.

The mobile boom system depicted in FIG. 13 comprises a multi-function boom subsystem 32 mounted on a holonomic-motion boom base platform 34, i.e., the boom base platform 34 is also capable of motion in any direction. For example, the double-headed arrow B represents motion of the base platform 34 along a floor. The boom base platform 34 may comprise a pair of sub-platforms 52 and 54 coupled by a roll-axis pivot rod 36. Each sub-platform 52, 54 has a respective pair of Mecanum wheels (only one Mecanum wheel 30a and 30b of each pair is visible in FIG. 13) rotatably mounted thereto. The boom base platform 34 may be made to move in any direction and turn by varying the speed and direction of rotation of each wheel. Each Mecanum wheel 30a/30b is driven to rotate by a respective independently controlled stepper motor (not shown in FIG. 13).

The boom base platform 34 further comprises a mast base 25 rigidly attached to the sub-platform 54 and a rotary mast 24 rotatably coupled to the mast base 25. The mast base 25 projects above the sub-platform 54 as seen in FIG. 13. The rotary mast 24 may take the form of a vertical stanchion which is rotatably coupled to the mast base 25 by bearings (not shown) for rotation about a pan axis (coaxial with its own axis). The rotary mast 24 is removable from the support mast base 25 for transport.

In accordance with the embodiment shown in FIG. 13, a tension reel 38 is mounted on sub-platform 52. A portion of the umbilical cable 22 is wound on tension reel 38. In addition, an electrical subsystem 50 (comprising electronics, controller hardware and an embedded personal computer) is mounted on sub-platform 54. The electrical subsystem 50 provides power to the motors (not shown in FIG. 13) incorporated in boom subsystem 32, crawler vehicle 100, and boom base platform 34.

The boom subsystem 32 is carried by the boom base platform 34. The boom subsystem 32 comprises a boom arm 20 in the form of a hollow tube having a channel for travel of a portion of the umbilical cable 22, which has a length greater than the length of boom arm 20. In the embodiment depicted in FIG. 13, boom arm 20 comprises a multiplicity of cylindrical boom arm segments 20a-20f made of a strong, lightweight material (e.g. carbon fiber), which are connected in series. A paid-out portion of the umbilical cable 22 travels in the channel of the boom arm 20.

Still referring to FIG. 13, an intermediate portion of the boom arm 20 is attached to a gimbal 26, which is in turn attached to an upper end of the rotary mast 24. The gimbal 26 and the boom arm 20, being mounted to the rotary mast 24, are also rotatable about the pan axis. In addition, the gimbal 26 enables the boom arm 20 to rotate about a tilt axis of the gimbal 26. Rotational encoders (not shown in FIG. 13, but see FIG. 14) are respectively attached to the rotary mast 24 and the gimbal 26 to measure the pan and tilt angles of the boom arm 20. This configuration allows the boom arm 20 to swing freely about pan and tilt axes relative to boom base platform 34.

Still referring to FIG. 13, the umbilical cable 22 can be extended or retracted using a pair of cable pinch rollers 40 which pinch the umbilical cable 22 adjacent a proximal end of boom arm 20. The cable pinch rollers 40 are driven to rotate (in opposite directions) by a cable motor 42. The umbilical cable 22 passes through the channel of boom arm 20 and exits boom arm 20 at a distal end thereof. The exiting portion of the umbilical cable 22 is guided by a passive cable guide pulley 48, which is mounted to the distal end of boom arm 20. Preferably, the portion of the umbilical cable 22 disposed between the crawler vehicle 100 and the cable guide pulley 48 may have an amount of slack. That portion of the umbilical cable 22 moves up or down, as indicated by double-headed arrow F in FIG. 13, as the umbilical cable 22 is retracted or extended respectively, as indicated by double-headed arrow E in FIG. 13.

During cable retraction/extension, the umbilical cable 22 is pulled/pushed through the hollow tube that is boom arm 20. The umbilical cable 22 is also pulled in an opposite direction by gravity acting on the weight of the crawler vehicle 100 and the additional length of the umbilical cable 22 connecting the boom arm 20 to the crawler vehicle 100. The motion of the umbilical cable 22 may be automatically extended or retracted by a cable motion control subsystem (which controls the cable motor 42) using feedback from a device that measures the boom arm tilt angle (e.g., a rotational encoder), as described in more detail below. This cable motion is coordinated with the base platform motion (also discussed later). A cable slack can be taken up using the tension reel 38 (or alternatively, allowed to accumulate in a bucket carried by the crawler vehicle 100).

As previously mentioned, the boom arm 20 is pivotably supported by gimbal 26, which in turn is attached to the distal end of rotary mast 24. The gimbal 26 allows the boom arm 20 to rotate about a tilt axis while the rotary mast 24 is rotatable about the pan axis. For example, the double-headed arrow C in FIG. 13 represents rotation of the boom arm 20 about the tilt axis of gimbal 26. The gimbal 26 is provided with a tilt angle sensor, while the rotary mast 24 is provided with a pan angle sensor, neither sensor being shown in FIG. 13. These angle sensors may take the form of rotational encoders (see, e.g., tilt encoder 60a and pan encoder 60b in FIG. 14).

The boom subsystem 32 shown in FIG. 13 further comprises counterweights 44 (only one is visible in FIG. 13) which are movable back and forth along the boom arm 20 (as indicated by double-headed arrow D in FIG. 13) for the purpose of balancing the moments on opposite sides of the gimbal 26 to achieve a boom arm equilibrium position. The counterweights 44 are moved by a motor-driven, non-backdrivable lead screw 46, which holds the weights in place even when power is disrupted. Control of counterweight position is provided either by direct operator commands or by a computer programmed in accordance with an automatic balancing algorithm. The automated position control is based on feedback of the gimbal tilt angle in order to achieve a neutrally balanced boom arm.

The boom subsystem 32 shown in FIG. 13 further comprises a fall arrest system. In order to stop a falling crawler vehicle 100, the fall arrest system monitors the rate of rotation of the boom arm about the tilt axis and if the rate of rotation exceeds preset threshold value, a two-state (on/off) fall arrest damper 28 is engaged, which slows the fall of the crawler vehicle 100.

Figure 14:
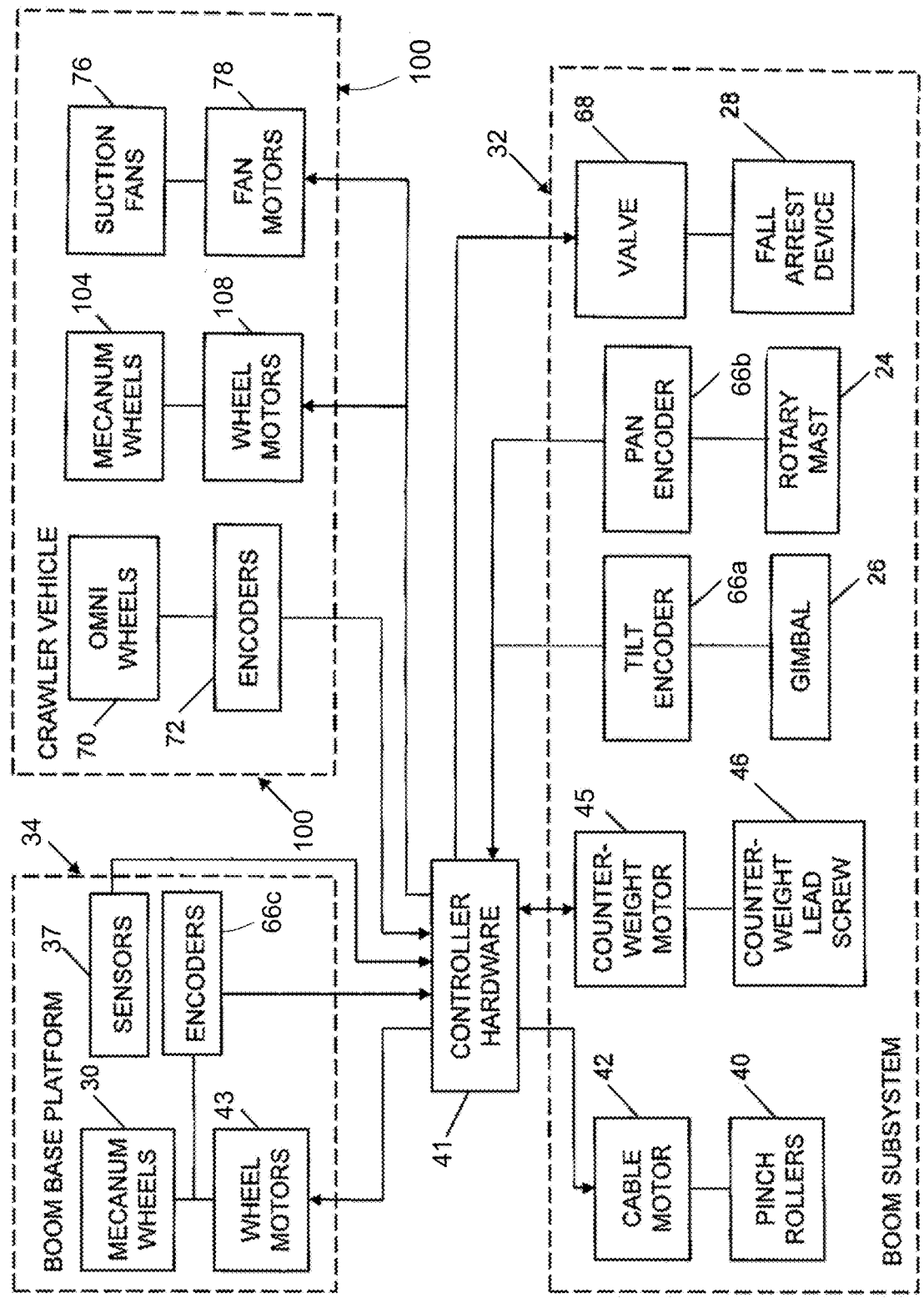
FIG. 14 is a block diagram identifying some components of the automated mobile boom system depicted in FIG. 13.

FIG. 14 is a block diagram identifying some components of the automated mobile boom system depicted in FIG. 13 (the probe carried by crawler vehicle 100 is not shown in FIG. 14). In accordance with the embodiment depicted in FIG. 14, the crawler vehicle 100 comprises a set of four unpowered omni wheels 70 for tracking vehicle motion and a set of four Mecanum wheels 104 for driving the crawler vehicle 100 under the control of a computer. The controller hardware 41 comprises circuitry for supplying power and motor control signals to a plurality of stepper motors 108 (which drive rotation of the Mecanum wheels 104) and to a plurality of fan motors 78 (which drive rotation of a plurality of suction fans 76 that create suction in corresponding suction zones, as taught in U.S. Pat. No. 8,738,226). These independently controlled suction zones allow the system to control the amount of force exerted on the Mecanum wheels 104 by the contacting surface. In addition, while the crawler vehicle 100 is being driven to move over a surface to be scanned, rotational encoders 72 coupled to the omni wheels 70 provide encoder pulses indicating incremental changes to the X, Y position of the crawler vehicle 100. The controller hardware 41 further comprises a data acquisition device for recording counts of the encoder pulses, which counts are used by a computer to track the vehicle motion in the manner described in U.S. Pat. No. 9,470,658.

Still referring to FIG. 14, the controller hardware 41 also supplies power and motor control signals to a plurality of stepper motors 43 which drive rotation of the Mecanum wheels 30 of boom base platform 34. Incremental changes in the angular positions of the output shafts of stepper motors 43 may be indicated by encoder pulses output by respective encoders 66c to controller hardware 41. The encoders 66c may be internal to the stepper motors 43. In addition, a plurality of sensors 37 are provided around the perimeter of the boom base platform 34 to detect obstacles for the purpose of collision avoidance. The outputs of encoders 66c and sensors 37 are recorded by one of the multiple data acquisition devices incorporated as parts of the controller hardware 41.

The controller hardware 41 further comprises circuitry for providing power and control signals to the cable motor 42 (which drives rotation of the cable pinch rollers 40) and to the counterweight motor 45 (not shown in FIG. 13, which drives rotation of the counterweight lead screw 46, which in turn move counterweights 44). The controller hardware 41 also comprises a data acquisition device for receiving data from a tilt angle sensor 66a and a pan angle sensor 66b. In addition, the controller hardware 41 comprises circuitry for closing an electrically controlled valve 68 in response to a detected robotic crawler fall event, thereby enabling the fall arrest damper 28 as previously described.

In order to function in an effective manner, the system implementing the robotic through-structure power and data transfer concept proposed herein requires the capability to accurately locate and record the 3-D position of a sub-surface (embedded) antenna/inductive charging coil. In some embodiments, the 3-D position data, defined in the coordinate system of the target object, is used to guide the mobile robot to a location where the probe is at an approximate (coarse) position, after which a signal strength-based position refinement process determines a more precise (fine) position of transducer alignment to enable data extraction and/or sensor system charging using the sub-surface antenna/inductive charging coil (or coils). Several options for approximate 3-D positioning will be described below, along with a signal strength-based position refinement process.

In accordance with one embodiment, an LPS-based laser beam guidance system is used to indicate or measure the 3-D position of a sub-surface antenna/inductive charging coil on the surface of the target object. In one type of use case, the user calibrates the LPS to the target object (e.g., an airplane). Then the system instructs the LPS to aim its laser pointer at a position (e.g., a previously recorded transducer position) on the surface of the airplane. An on-board vision system of the UAV, crawler vehicle, or articulated arm robot provides camera-based feedback to the vehicle's navigation system to guide the vehicle toward the laser spot on the surface. Once the UAV, crawler vehicle, or articulated arm robot has moved to a location where the probe is close to the target position, a separate system can refine the positions of the power and/or data transfer components using a signal strength sensing process.

Figure 15:
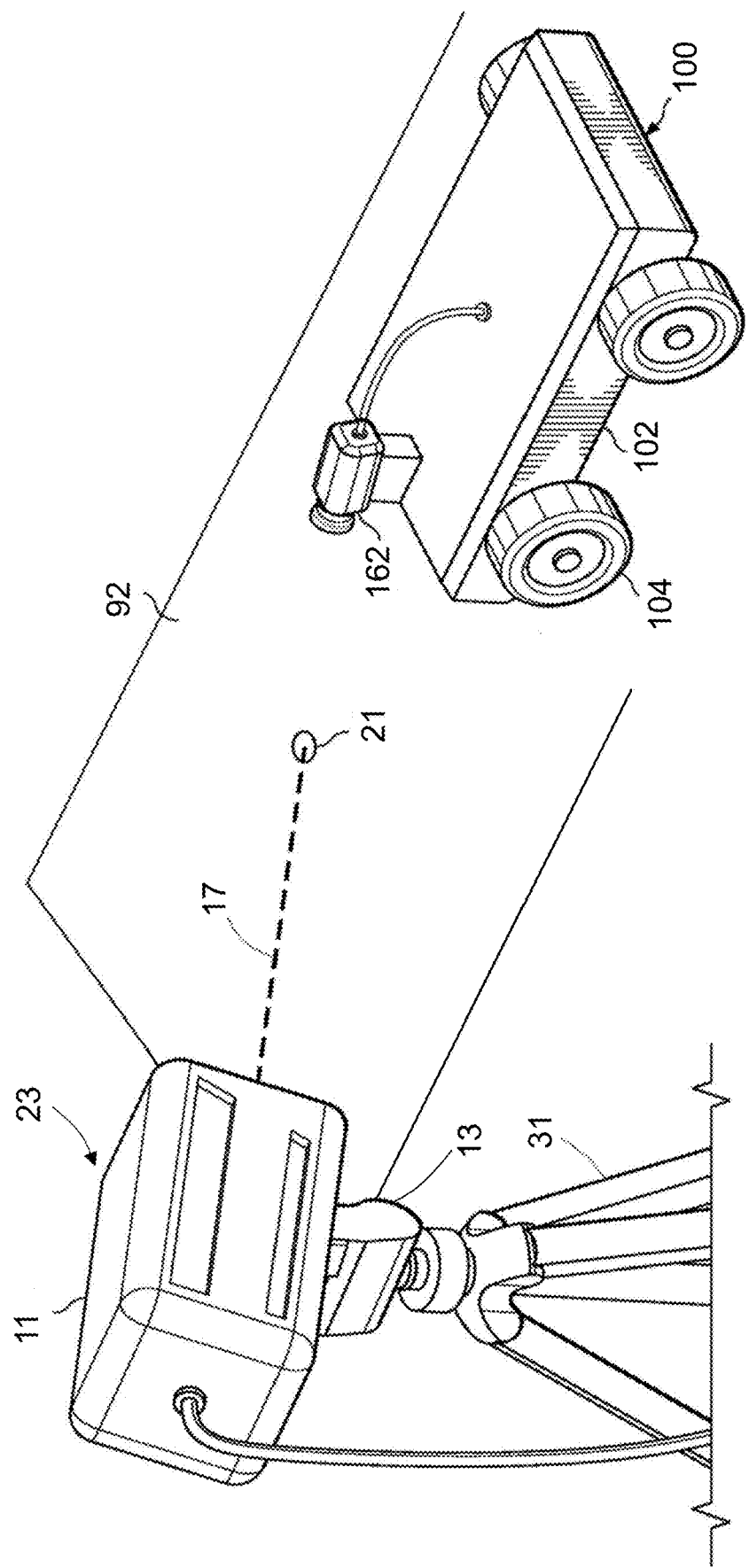
FIG. 15 is a diagram representing a 3-D view of an LPS-based laser beam guidance system for indicating or measuring the 3-D location of an embedded transducer on a target object.

FIG. 15 is a diagram representing a 3-D view of an LPS-based laser beam guidance system for indicating or measuring the 3-D location of an embedded (sub-surface) antenna/inductive charging coil on a target object in accordance with one embodiment. The probe (not shown in FIG. 15) is mounted on a crawler vehicle 100. The crawler vehicle 100 is configured to move along the surface 92. In accordance with one proposed implementation, the crawler vehicle 100 includes a frame 102 and four Mecanum wheels 104. The crawler vehicle 100 further includes a video camera 162 that is mounted to frame 102 and controlled by an onboard computer system (not shown in FIG. 15). The onboard computer system also sends commands to respective motor controllers that control operation of respective motors (not shown in FIG. 15) which drive coordinated rotations of the Mecanum wheels 104.

The LPS 23 includes a video camera 11 and a laser range meter (not visible in FIG. 15) that emits a laser beam 17 (indicated by a dashed line). The beam control unit (not shown in FIG. 15) is configured to direct the laser beam 17 onto an area on surface 92, thereby producing a laser spot 21. Movement of crawler vehicle 100 may be remotely controlled by a human operator or controlled automatically by the onboard computer system based on recognition of the laser spot 21. In particular, the crawler vehicle may be located on surface 92 in such a way that the laser spot 21 appears within the field of view of the video camera 162 carried by the crawler vehicle 100. Images may be captured and then processed to iteratively determine the location of the crawler vehicle 100 relative to the laser spot 21. A motion controller causes crawler vehicle 100 to move to reduce a difference between the position of laser spot 21 in the images generated by video camera 162 and a reference position that has been pre-defined for the images. The reference position may, for example, be the center pixel of the image frames generated by video camera 162. Further, the reference position remains fixed in the different images generated by video camera system 162 as crawler vehicle 100 moves.

In accordance with one proposed implementation, when the centroid of the laser spot appearing in an image frame is at a specified pixel location in the image frame, the distance separating the center of the probe (not shown in FIG. 15) from the center of the laser spot 21 on surface 92 is computed. Then the crawler vehicle 100 is moved forward by a distance equal to the measured separation distance, thereby placing the probe in a coarse position which is at least approximately aligned with the sub-surface transducer.

The method for providing guidance to a motion platform using the laser beam guidance system depicted in FIG. 15 includes the following steps: (a) directing light at an illuminated spot on the external surface of the skin having coordinates that match the coordinates of the estimated target position; (b) capturing an image of an area on the external surface of the skin that includes the illuminated spot using a camera onboard the motion platform; (c) calculating a deviation of a position of a centroid of an image of the illuminated spot in the captured image from a position of a reference pixel in the captured image; and (d) controlling movement of the motion platform in a manner that reduces the position deviation.

Another aspect of this type of position system is the acquisition of 3-D position data from any location of interest on the target object. For example, after the LPS 23 is calibrated to the target environment, the LPS can be used to record the 3-D positions of points associated with discovery of a sub-surface transducer, which can then be stored and used for guiding the robotic vehicle back to that position later.

Another method of tracking uses landmarks placed at positions overlying the sub-surface transducer of a sensor node, and then an on-board vision system is used to guide the vehicle to the target location. But marking the surface of a target object like an aircraft with visible landmarks is not a viable solution for airlines. An alternate solution would be to mark the location with a material (e.g., paint or ink) that is only visible under ultraviolet (UV) light. The process would involve attaching a UV spotlight source, such as a black light, to the mobile robot and aim the UV light in the direction of the target object. The area marked with UV-visible material will show up on the onboard video camera of the robotic vehicle and can be used to guide the vehicle to the target object.

The method for tracking a motion platform using landmarks includes the following steps: (a) attaching a landmark on the external surface of the skin having coordinates that match the coordinates of the estimated target position; (b) capturing an image of an area on the external surface of the skin that includes the landmark using a camera onboard the motion platform; (c) calculating a deviation of a position of a centroid of an image of the landmark in the captured image from a position of a reference pixel in the captured image; and (d) controlling movement of the motion platform in a manner that reduces the position deviation.

Figure 16:
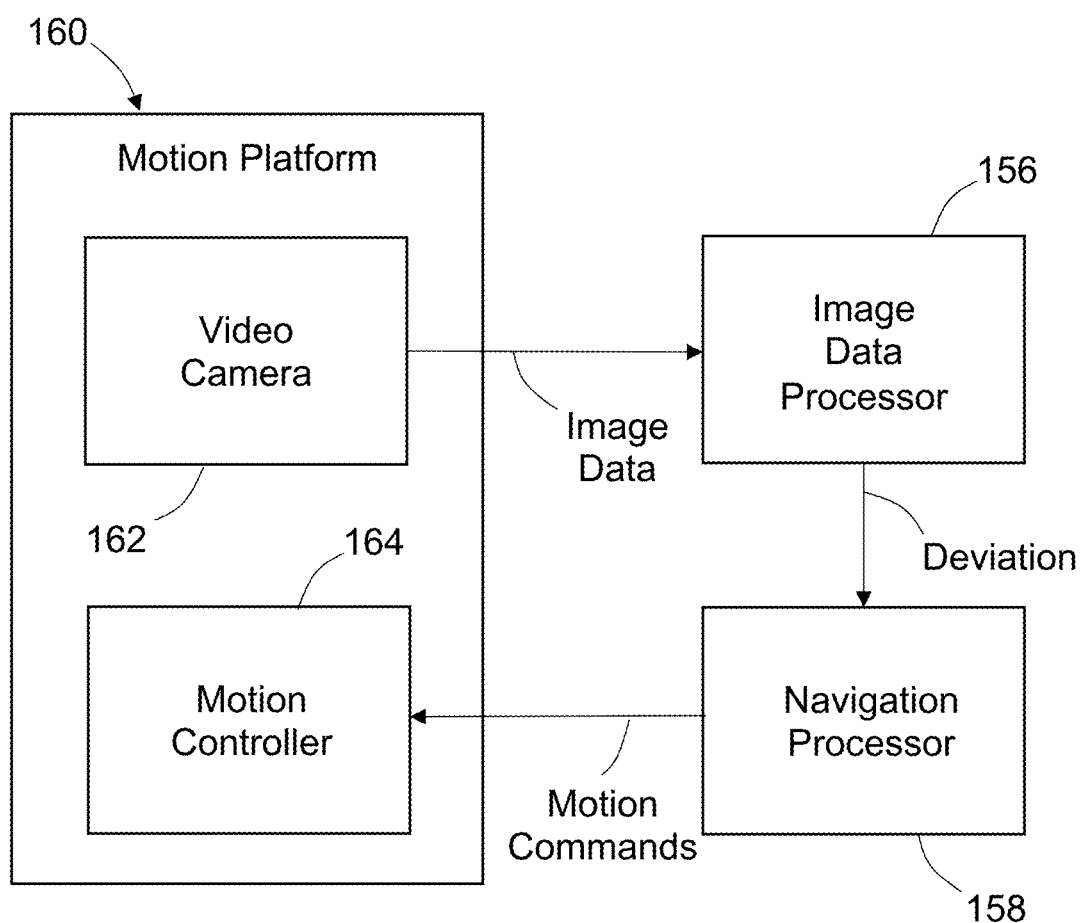
FIG. 16 is a block diagram identifying some components of a system comprising an automated motion platform having a camera that captures images and an image-based navigation system that sends motion commands to the automated motion platform.

FIG. 16 is a block diagram identifying some components of a system comprising an automated motion platform 160 (e.g., a UAV, a crawler vehicle, or a motion platform) having a video camera 162 that captures images and an image-based navigation system that sends motion commands to the automated motion platform 160. The image-based navigation system includes an image data processor 156 and a navigation processor 158, which may be components of a workstation at a ground-based operations center that communicates wirelessly with the automated motion platform 160. In an alternative embodiment, the image-based navigation system may be onboard the motion platform.

The image data processor 156 receives image data from video camera 162 and then calculates a deviation of the position of a visible feature that overlies a sub-surface transducer from the position of a reference pixel in the captured image. In one proposed implementation, the image data processor is configured to iteratively detect visual differences between captured images and a reference image and then calculate the deviation of the pixel position of the laser spot in the captured image from the pixel position of the centroid of the reference image. This deviation is sent to the navigation processor 158, which is configured to generate motion commands for controlling movement of auto- mated motion platform 160 in a manner that reduces the magnitude of the deviation. The navigation processor 158 sends the motion commands to a motion controller 164 onboard the automated motion platform 160. For example, the motion controller 164 may include a central processing unit (CPU) connected to a plurality of motor controllers. The CPU is configured to orchestrate the operation of the motors that drive translation and rotation of the motion platform.

Figure 17:
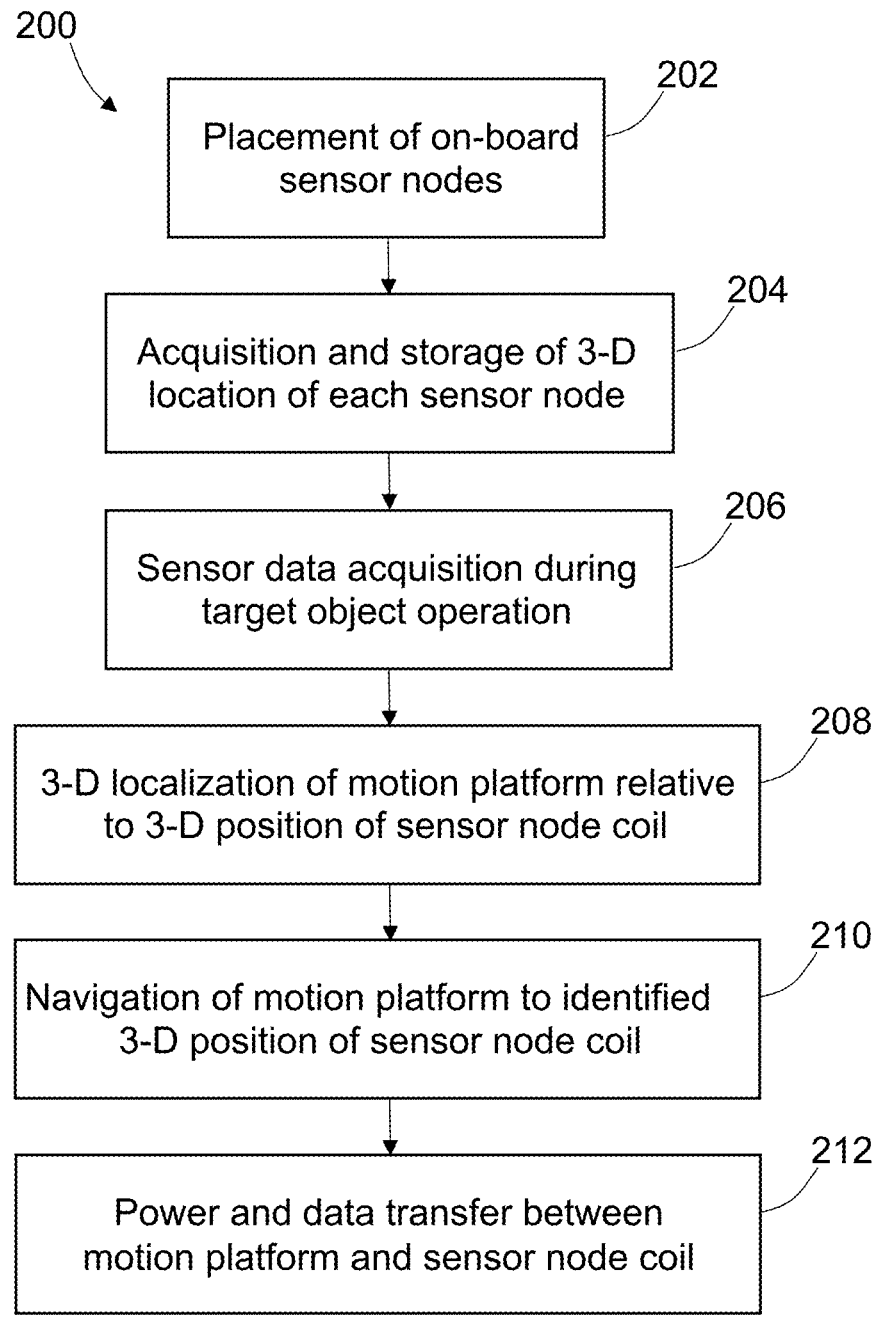
FIG. 17 is a flowchart identifying steps of a method for transferring power and data between an automated motion platform and a sensor node.

FIG. 17 is a flowchart identifying steps of a method 200 for transferring power and data between an automated motion platform and a sensor node. A sensor node is placed behind a skin onboard an aircraft (step 202). Coordinates representing an estimated position of a transducer of the sensor node under a skin of the aircraft in a 3-D coordinate system of the aircraft are acquired and stored (step 204). More specifically, the coordinates of an estimated target position on an external surface of the skin which is aligned with a position of the transducer of the sensor node in a 3-D coordinate system of the aircraft are calculated. Thereafter, during operation of the aircraft, a sensor of the sensor node is used to collect sensor data (step 206). After sensor data collection has ceased, a 3-D localization technique is used to locate a probe-equipped motion platform relative to a 3-D location of the sub-surface transducer of the sensor node (step 208). The motion platform then navigates under computer control to the identified 3-D position of the sensor node transducer (step 210). While the transducers are aligned, power, data, or computer instructions may be wirelessly transferred from the motion platform to the sensor node and sensor data may be transferred from the sensor node to the motion platform (step 212).

In accordance with one proposed implementation, the method for transferring power and data between a probe onboard an automated motion platform and a sub-surface sensor node includes the following steps: (a) coordinates representing an estimated position of a transducer of a sensor node under a skin of a target object in a three-dimensional coordinate system of the target object are acquired and stored; (b) coordinates are calculated of an estimated target position on an external surface of the skin which is aligned with a position of the transducer of the sensor node in a three-dimensional solid model of the target object; (c) a sensor of the sensor node is used to collect sensor data during operation of the target object; (d) the motion platform navigates to a coarse position on the external surface of the target object where a transducer position of a transducer onboard the motion platform has coordinates which match the coordinates of the estimated target position; (e) power is transferred from the transducer onboard the motion platform to the transducer of the sensor node after the motion platform has arrived at the coarse position by transmitting first RF signals using the transducer onboard the motion platform; (f) the first RF signals are received using the transducer of the sensor node; (g) second RF signals are transmitted using the transducer of the sensor node in response to reception of the first RF signals; (h) the second RF signals are received using the transducer onboard the motion platform; (i) a strength of the received second RF signals is sensed onboard the motion platform; (j) moving the motion platform incrementally to a position where the sensed strength of the received second RF signals is increased; and (k) determining whether the sensed strength of the received second RF signals is a maximum or not. Steps (f) through (k) are iteratively performed until a determination is made in step (k) that the sensed strength of the received second RF signals is maximum.

In order to determine when the platform position has produced a global (absolute) maximum, the motion platform (and probe) first performs a search around the estimated sensor unit position. This search will explore the full area around a target region (the overall category of this type of search is sometimes referred to as an exhaustive search). This type of search process is one of the optimization methods that can be used, but not the only one.

Another optimization method is a type that can find a relative maximum, which may not be the global (absolute) maximum, but the result may be within an acceptable signal strength range for power and data transfer (i.e., when the measured signal strength meets a pre-defined threshold). This type of iterative search method is similar to a gradient descent optimization.

In accordance with one embodiment, the method further comprises: (l) sending collected sensor data from the sensor node to the motion platform via the antenna of the sensor node and motion platform; (m) storing the sensor data in a non-transitory tangible computer-readable storage medium onboard the motion platform; (n) sending a send data command from the motion platform to the sensor node via the antenna of the sensor node and motion platform; and (o) receiving the send data command in the sensor node.

Figure 18:
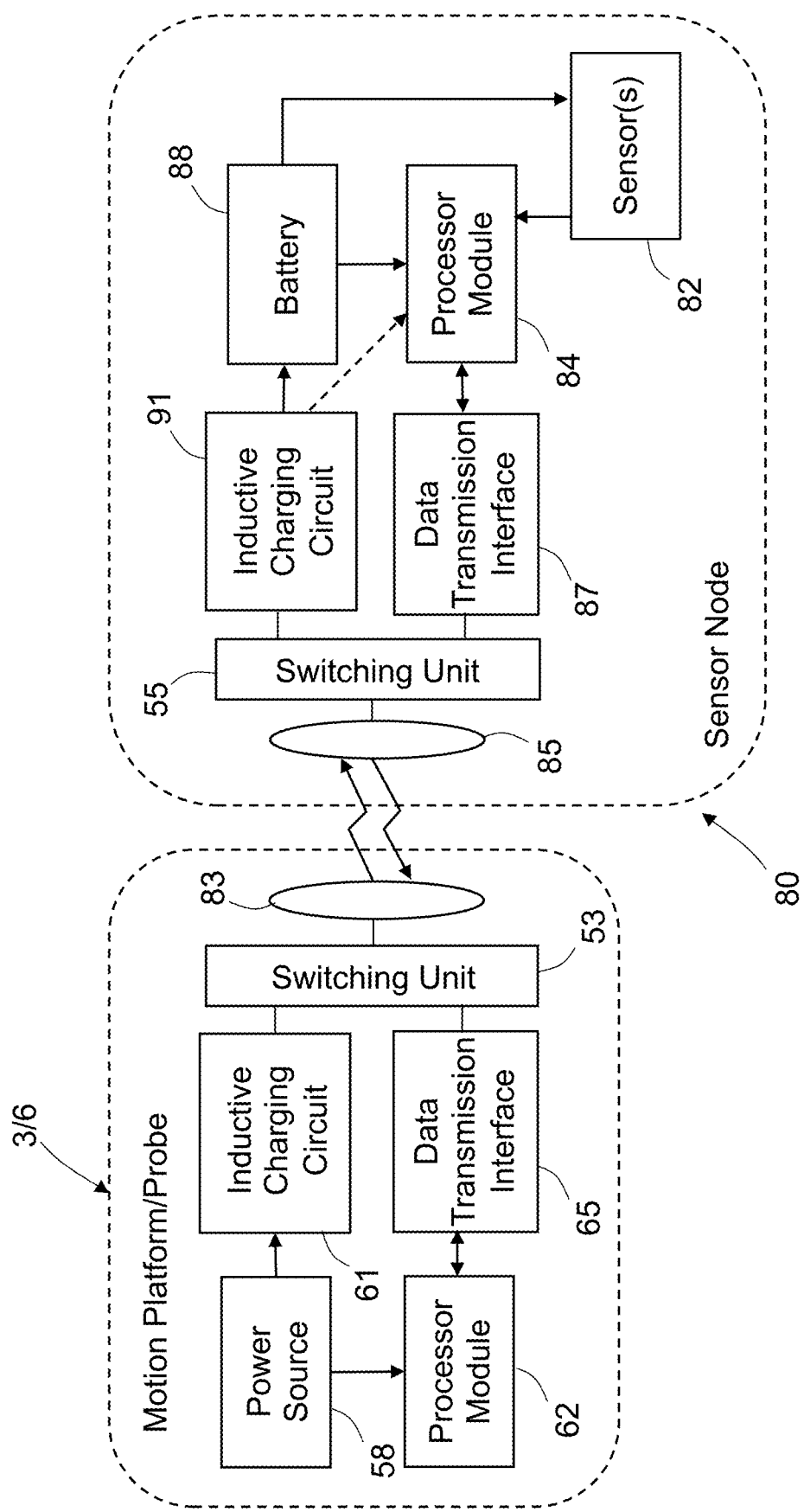
FIG. 18 is a block diagram identifying components of a sensor node and an automated motion platform having transducers which are used for both power transfer and data transfer in accordance with an alternative embodiment.

FIG. 18 is a block diagram identifying components of a sensor node 80 and a probe-equipped motion platform 3 in accordance with an alternative embodiment. Again, probe 6 includes a pair of transducers. One transducer is the coil of inductive charging module 60 and the other transducer is antenna 64. The power source 58 and the processor module 62 may be incorporated inside the probe 6 or separately mounted to the motion platform 3 and electrically connected to probe 6.

The sensor node 80 includes a battery 88 and an inductive charging circuit 91. The inductive charging circuit 91 is connected to transducer 85 via a switching unit 55. The switching unit 55 switches open the coil to create an open loop for the antenna, and also switches the circuit from induction power to the data transmission elements. The inductive charging circuit 91 is configured to convert alternating current induced in transducer 85 into direct current for charging the battery 88. The sensor node 80 further includes at least one sensor 82, a processor module 84 which is configured to store in memory the data acquired by the sensor 82, and a data transmission interface 87 for reformatting sensor data output by the processor module 84 for transmission to the motion platform 3 via switching unit 55 and transducer 85. Sensor 82 and processor module 84 receive power from battery 88. The processor module 84 may also receive power directly from inductive charging circuit 91. The inductive charging circuit 91, processor module 84, data transmission interface 87, and switching unit 55 may be integrated into a PWB.

Still referring to FIG. 18, the motion platform 3 includes a power source 58, while the probe 6 includes an inductive charging module 60. The inductive charging module 60 includes a transducer and inductive charging circuitry (e.g., alternating current components). When probe 6 is properly positioned, the transducer of inductive charging module 60 is aligned with and wirelessly coupled to the transducer of inductive charging module 90. The probe 6 further includes an antenna 64, while the motion platform 3 (or probe 6) further includes a processor module 62 which is connected to antenna 64. Both inductive charging module 60 and processor module 62 receive power from the power source 58.

Still referring to FIG. 18, the inductive charging circuit 61 is connected to transducer 83 via a switching unit 53. When probe 6 is properly positioned, the transducer 83 is aligned with and wirelessly coupled to transducer 85. The motion platform 3 (or probe 6) further includes a data transmission interface 65. The processor module 62 receives sensor data from transducer 83 via switching unit 53 and data transmission interface 65 and stores that sensor data in memory. The probe 6 further includes an inductive charging circuit 61 configured to generate alternating current having a resonant frequency that matches the resonant frequency of inductive charging circuit 91. The inductive charging circuit 61, processor module 62, data transmission interface 65, and switching unit 53 may be integrated into a PWB incorporated in the probe 6.

The state of switching unit 55 may be controlled by processor module 84, while the state of switching unit 53 is controlled by processor module 62. In a power transfer mode, switching unit 53 connects inductive charging circuit 61 to and disconnects data transmission interface 65 from transducer 83, while switching unit 55 connects inductive charging circuit 91 to and disconnects data transmission interface 87 from transducer 85. Conversely, in a data transfer mode, switching unit 53 disconnects inductive charging circuit 61 from and connects data transmission interface 65 to transducer 83, while switching unit 55 disconnects inductive charging circuit 91 from and connects data transmission interface 87 to transducer 85.

In contrast to the system depicted in FIG. 18 having a single pair of aligned transducers, the system depicted in FIG. 4 has two pairs of aligned transducers: one pair of mutually aligned inductive charging coils and one pair of mutually aligned antennas. A variety of transducer configurations are possible in systems having a pair of antennas and a pair of inductive charging coils.

Figure 19C:
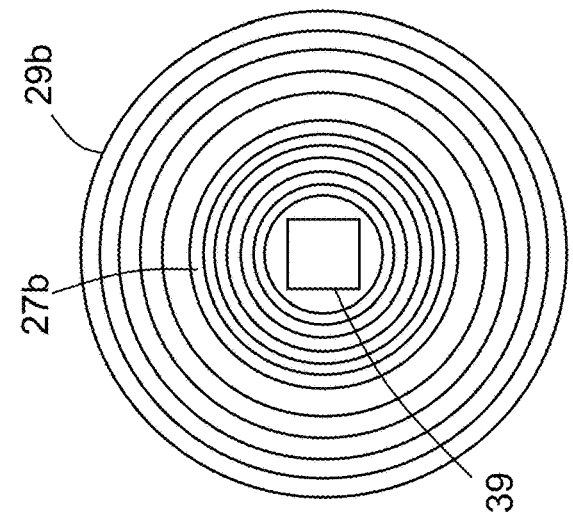
FIG. 19C is a diagram representing a plan view of a transducer configuration in which a circular planar spiral inductive charging coil surrounds a circular planar spiral antenna in accordance with a third proposed implementation.
Figure 19B:
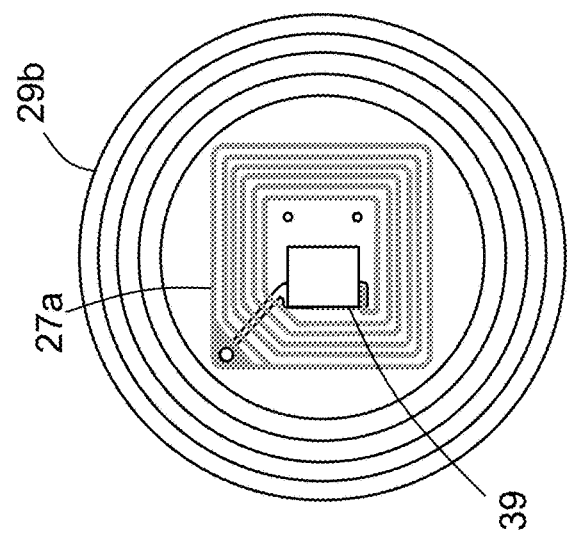
FIG. 19B is a diagram representing a plan view of a transducer configuration in which a circular planar spiral inductive charging coil surrounds a rectangular planar spiral antenna in accordance with a second proposed implementation.
Figure 19A:
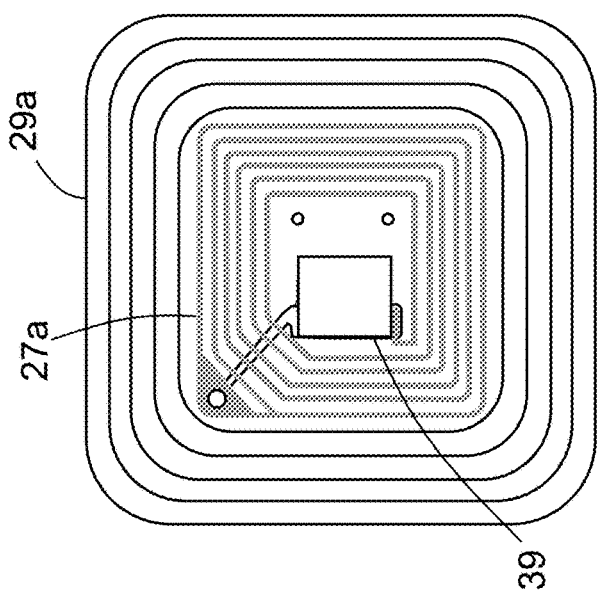
FIG. 19A is a diagram representing a plan view of a transducer configuration in which a rectangular planar spiral inductive charging coil surrounds a rectangular planar spiral antenna in accordance with a first proposed implementation.

FIG. 19A is a diagram representing a plan view of a transducer configuration in which a rectangular planar spiral inductive charging coil 29a surrounds a rectangular planar spiral antenna 27a in accordance with a first proposed implementation. The rectangular planar spiral antenna 27a is connected to a PWB 39 that includes transceiver circuitry. The rectangular planar spiral inductive charging coil 29a is connected to a PWB (not shown in FIG. 19A) that includes inductive charging circuitry. FIG. 19B is a diagram representing a plan view of a transducer configuration in which a circular planar spiral inductive charging coil 29a surrounds a rectangular planar spiral antenna 27a in accordance with a second proposed implementation. FIG. 19C is a diagram representing a plan view of a transducer configuration in which a circular planar spiral inductive charging coil 29a surrounds a circular planar spiral antenna 27b in accordance with a third proposed implementation.

In each of the transducer configurations depicted in FIGS. 19A-19C, the antenna and inductive charging coil are coplanar and concentric (have the same center). If the transducer arrangement is concentric, then the laser beam guidance system depicted in FIG. 15 need produce only one laser spot at a point on a surface overlying the center of the sub-surface concentric transducers of the sensor node. This makes the system rotation invariant.

Once in the approximate (coarse) position (i.e., within about one inch of a sensor node transducer), the robotic application may use the RF signal strength to guide the robot or its end effector in a search pattern of the local area to determine the position of maximum signal strength of the embedded sensor node. In one variation of the optimization process for finding the precise location of the sensor node, the robot or end effector is moved in a direction of increasing signal strength (and opposite to the direction of decreasing signal strength), which is similar to the way a gradient-descent optimization method works. In another variation of the optimization process, a search pattern (such as a spiral search) is used to explore the region around the approximate sensor node location in order to find the position of maximum signal strength; once found, the method instructs the robot to move the end effector to that location, Once the peak signal strength position is located, the through-structure power and data transfer process may begin. Also, this discovered 3-D position may be acquired and recorded by the off-board tracking/measurement system or marked by the robot to provide a landmark for future location reference. This refinement only works for small distances from the target; it requires another larger-scale position tracking method, such as one of those described above, in order to get the vehicle close to the target location, at which point the refinement method gets the vehicle and/or its end effector to the final destination.

Preferably, the signal strength measurement process occurs before the system enters into the charging mode, although some charging may occur during the signal strength measurement process if the received power is above the charging threshold. The sensor node's detection of the presence of inductive charging acts as a trigger event for the sensor node processor to enable the transmission of the RF signal.

Power transfer may occur when the received voltage and current from the inductive charging components exceed the minima needed to energize the processor circuit and the battery charging minimum. These may be different values (for example, the minimum value to charge the battery will likely be higher than the minimum needed to energize the processor circuit), so two threshold values may be employed: (1) the minimum to energize the processor circuit (which "wakes up" the processor); and (2) the minimum power needed to charge the battery.

The trigger event for the sensor node to start sending the RF signal happens when the power transmitted by the inductive charging system of the probe exceeds the minimum threshold value needed to energize the sensor node's processor circuit. The energy from the probe may not be fully powering the sensor processor at that time, since the processor can pull power from the battery, assuming the battery is not completely depleted. The processor may not be in a fully active state when the probe initially comes into range, and the processor needs some type of event to tell it to power up. Once the trigger event has occurred, the processor stays on. The probe will initially be in the searching mode and may go in and out of the range needed to generate the minimum threshold value needed to energize the sensor node. The inductive power does not have to stay above the threshold for RF to stay on (using battery power); it just needs to go above the threshold once to trigger the process to wake up and start sending the RF signal.

The RF signal generation and RF data transmission are different functions of the wireless system. When in the data transfer mode, the processor encodes sensor data into a form that is combined (modulated) with the RF carrier signal for transmitting information, but the system can also generate a RF signal without sending other data. This is the mode that the sensor node is in when the probe is running its signal strength measurement process. No data transfer is happening when the probe is still trying to find the location for the best data transfer. When the probe is in a state ready to receive the data—i.e., it has a sufficiently strong signal and is in a receiving mode—then the probe instructs the sensor node to send the data by sending a "send data" command to the sensor node (over the RF communication link). The signal strength measurement mode just detects the RF carrier frequency; it is not reading the sensor data at that time.

In order to get into a "ready to receive sensor data" state, the probe will try to maximize the connection signal strength first. This search process may involve moving around in a pre-defined search pattern, and then choosing the best position based on the signal strength information it captured during the search process. This happens before attempting to transfer sensor data. (This assumes that the "best" position has sufficient minimal signal strength; if it does not meet the minimum, then it will need to continue searching or abort.)

Since the RF parts of the probe and sensor nodes are co-located with the inductive charging components in the concentric transducer configurations, the assumption may be made that an optimal RF signal will also be optimal for charging. The system cannot transfer sufficient power unless the transducer of the probe onboard the motion platform is sufficiently close to the transducer of the sensor node. The same is true for the RF signal antennas.

Sometimes the sensor node's battery will be dead when the probe-equipped motion platform arrives, in which case the sensor node will not be able to use battery power to continuously send the RF signal when the probe is in the search pattern. in this case, the system will have to use inductive charging to power the processor and RF signal and use a less efficient search process. That alternate search process takes into account the possibility that the RF signal could drop out when the distance separating the transducers becomes too large, in which case the probe is moved in the opposite direction to reacquire the signal. instead of a spiral or grid search pattern (which could be used if there is some power left in the battery), an alternative pattern would be used, such as one that returns to a known good location after signal loss, then moves out until the RF signal is lost again, and then returns to the best location so far (based on signal strength).

Thus, if some battery power is left in the sensor mode, signal strength measurement occurs before power transfer from the robot through the inductive charging coil to the sensor node. If the battery is dead, signal strength measurement and energizing the processor happen at the same time (power transfer for batter charging then happens after the signal strength measurement search is complete).

Figure 20A:
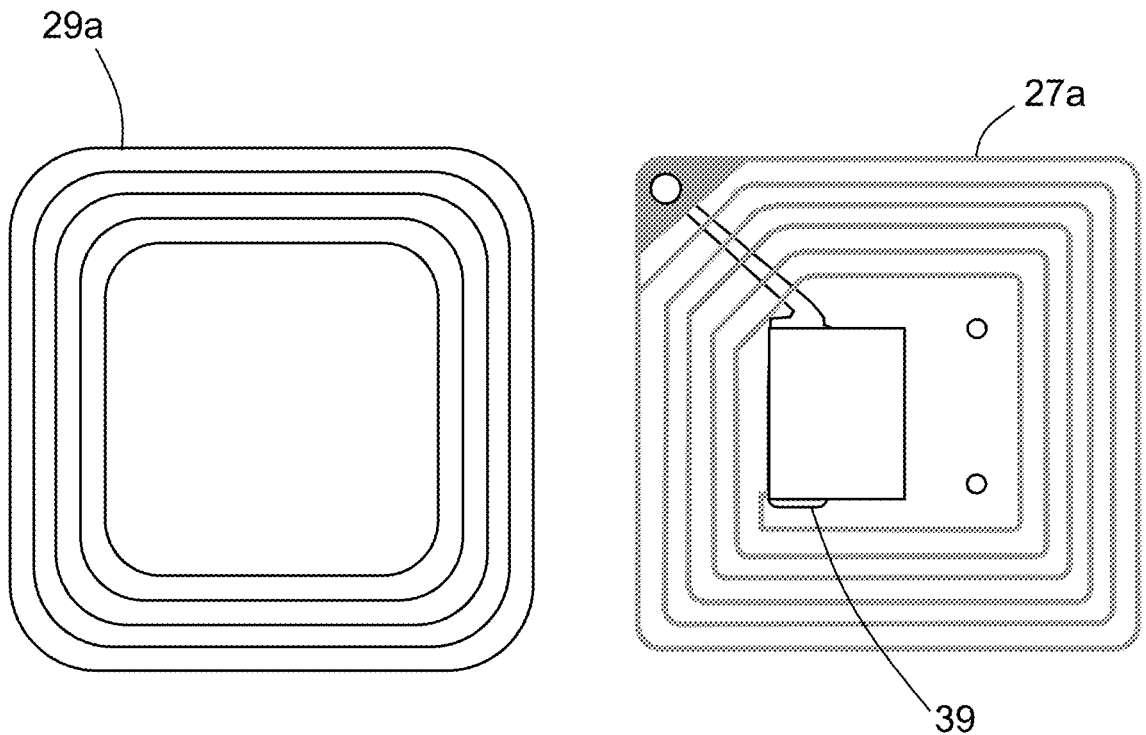
FIG. 20A is a diagram representing a plan view of a side-by-side transducer configuration in which a rectangular planar spiral inductive charging coil and a rectangular planar spiral antenna are coplanar and adjacent to each other in accordance with a fourth proposed implementation.
Figure 20B:
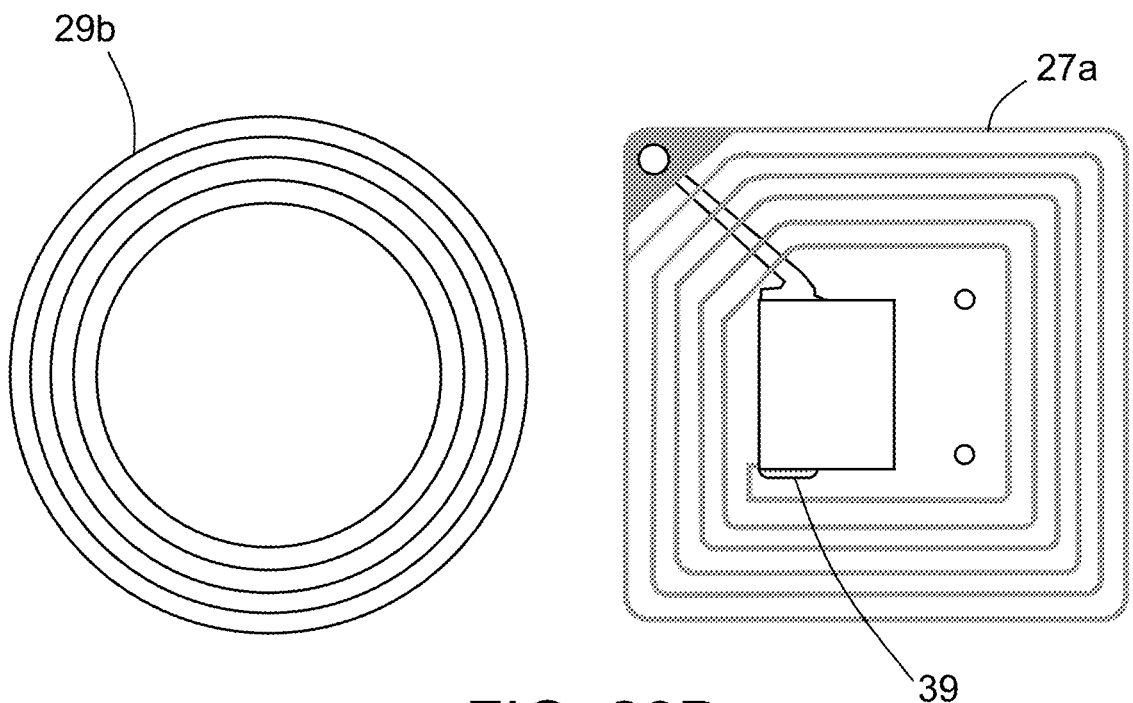
FIG. 20B is a diagram representing a plan view of a side-by-side transducer configuration in which a circular planar spiral inductive charging coil and a rectangular planar spiral antenna are coplanar and adjacent to each other in accordance with a fifth proposed implementation.

FIG. 20A is a diagram representing a plan view of a side-by-side transducer configuration in which a rectangular planar spiral inductive charging coil 29a and a rectangular planar spiral antenna 27a are coplanar and adjacent to each other in accordance with a fourth proposed implementation. FIG. 20B is a diagram representing a plan view of a side-by-side transducer configuration in which a circular planar spiral inductive charging coil 29a and a rectangular planar spiral antenna 27a are coplanar and adjacent to each other in accordance with a fifth proposed implementation.

The concentric transducer configuration has some advantages over a non-concentric (side-by-side) transducer configuration since achieving a specific relative orientation between the probe and sensor node components is not needed for the concentric transducer configuration, but there are solutions that will work for non-concentric arrangements.

For non-concentric arrangements, there needs to be a separate step to align the other components (inductive charging coils). Initially, the probe is used to measure RF signal strength to optimize antenna to antenna alignment (as is done for the concentric arrangement), but then a second step is needed to align the inductive charging coils.

In accordance with one proposed solution, if some external orientation alignment indication is available—such as two positions of an indicator spot (e.g., a laser spot) from an external positioning system, such as the LPS device (as discussed earlier), where the LPS points at the antenna location, briefly pauses, and then points at the inductive charging coil location—then that will be sufficient to provide an indication of the relative orientation. This approach works even if the position coordinates are slightly off, because the general direction of the relative orientation of the transducers will still be reasonably accurate for this alignment purpose. For this setup, the automated motion control system (e.g. robot) has a camera that detects the spot positions optically and can determine the relative angle between them as compared to the camera's (and robot's) current angle. Once this relative angle is determined, the automated motion control system would pivot the probe about the found antenna position until the desired relative angle is reached. It then stops moving and is ready for data and power transfer.

One variation of this method is to use two laser pointers which emit laser beams of different colors. The two laser pointers may be components of two separate local positioning systems linked together (networked) so that the colored spots (e.g., red and green) are synchronized, one pointing to the inductive charging coil and the other pointing to the antenna for each sensor node location.

An alternative method that does not rely on an external positioning source for orientation information uses received inductive charging coil power information from the sensor node to feed back to the probe while the automated motion control system (e.g., robot) pivots the probe about the found antenna position. As the pivoting is occurring, the inductive power transfer intensity data detected by the sensor node is sent to the probe through the RF channel. The power values are stored along with the current rotation angle values in the memory of the probe's microprocessor. Once a full pivot rotation (360 degrees) about the antenna location is completed, the robot rotates the probe to the angle at which the highest inductive power transfer intensity was found. The robot then stops moving and is ready for data and power transfer.

Figure 21:
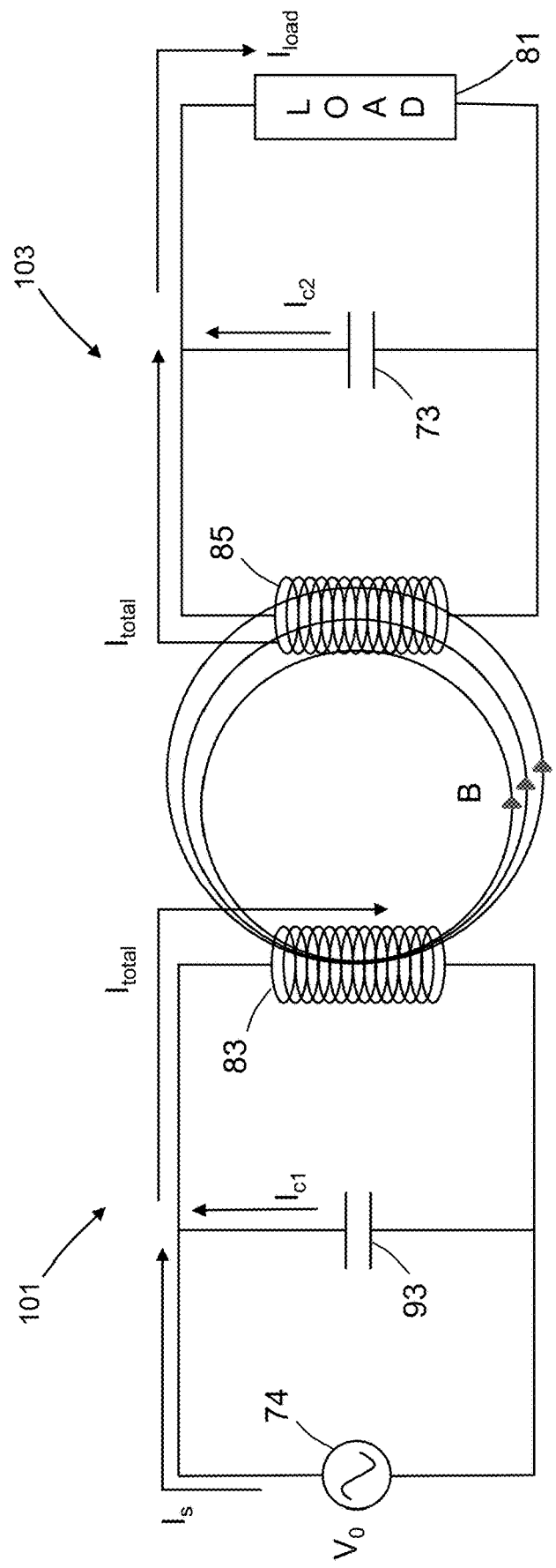
FIG. 21 is a circuit diagram representing a transmitter and a receiver in a resonant system.

FIG. 21 is a circuit diagram representing a transmitter 101 and a receiver 103 that form a resonant system when separated by a distance within a resonant inductive coupling range. This diagram (from U.S. Published Patent Application No. 2019023799) shows the basic principle of the power transfer operation performed by the inductive coupling modules depicted in FIGS. 4 and 18. The transmitter 101 comprises an LC circuit connected to an AC source 74. The AC source 74 outputs an alternating current having a voltage $V_0$. The LC circuit in the transmitter 101 comprises a transmit transducer 83 and a capacitor 93 that tunes the transmit transducer 83 to produce a magnetic field B (indicated by the circles in FIG. 21) that oscillates at the resonant frequency. The transmit transducer 83 receives a current $I_{total}$ which is the sum of the current $I_s$ from the AC source 74 and the current $I_{c1}$ from the capacitor 93 (i.e., $I_s+I_{c1}=I_{total}$). The receiver 103 comprises an LC circuit connected to a load 81 (e.g., a battery charger). The LC circuit in the receiver 103 comprises a receive transducer 85 and a capacitor 73 that tunes the receive transducer 85 to the resonant frequency. During resonant inductive coupling, the load 81 receives a current $I_{load}$ which is the sum of the current $I_{total}$ induced in the receive transducer 85 and the current $I_{c2}$ from the capacitor 73 (i.e., $I_{total}+I_{c2}=I_{load}$).

Figure 22:
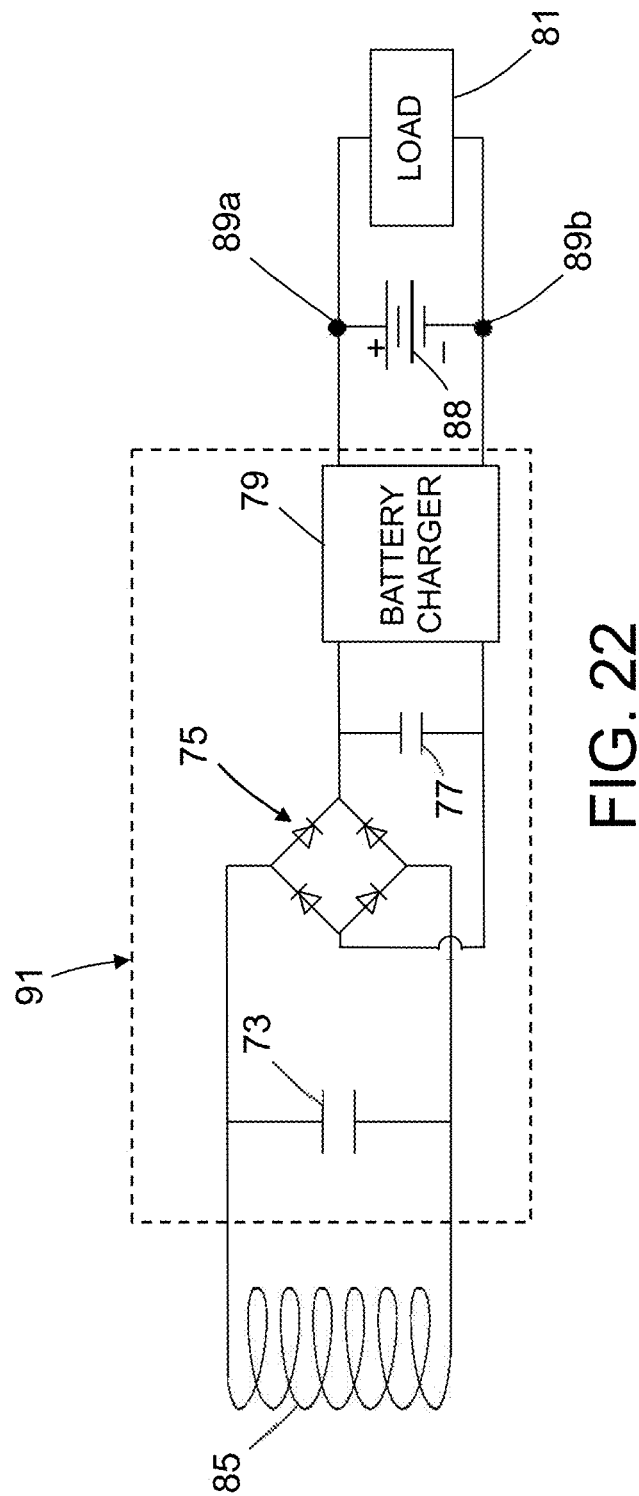
FIG. 22 is a circuit diagram identifying some components of a battery charging system onboard a receiving aircraft in accordance with one embodiment.

FIG. 22 is a circuit diagram (also from U.S. Published Patent Application No. 2019023799) identifying some components of a sensor node in accordance with one embodiment. The sensor node components depicted in FIG. 22 include: a receive transducer 85 in which an alternating current is induced; a capacitor 73 that is connected to the receive transducer 85 for tuning the receive transducer 85 to a resonant frequency; a rectifier 75 that is connected to the receive transducer 85 and to the capacitor 73 for converting alternating current from the receive transducer 85 and capacitor 73 into direct current; a smoothing capacitor 77 that is connected to receive direct current from the rectifier 75; a battery charger 79 that is connected to receive direct current from the rectifier 75 and the smoothing capacitor 77; and a battery 88 having a positive terminal 89a and a negative terminal 89a connected to the battery charger 79. The battery charger 79 is configured to charge the battery 88 using direct current produced from alternating current induced in the receive transducer 85 and alternating current from the capacitor 73. More specifically, the battery charger 79 may comprise a voltage regulator to avoid overcharging the battery 88, a current limiter to ensure that charging does not occur too rapidly, and temperature sensors which indicate to the battery charger 79 when charging should cease because the battery 88 is overheating. As depicted in FIG. 22, once the battery 88 has been recharged, it can be used to provide direct current to a load 81 (e.g., a sensor 82 seen in FIG. 4).

Figure 23:
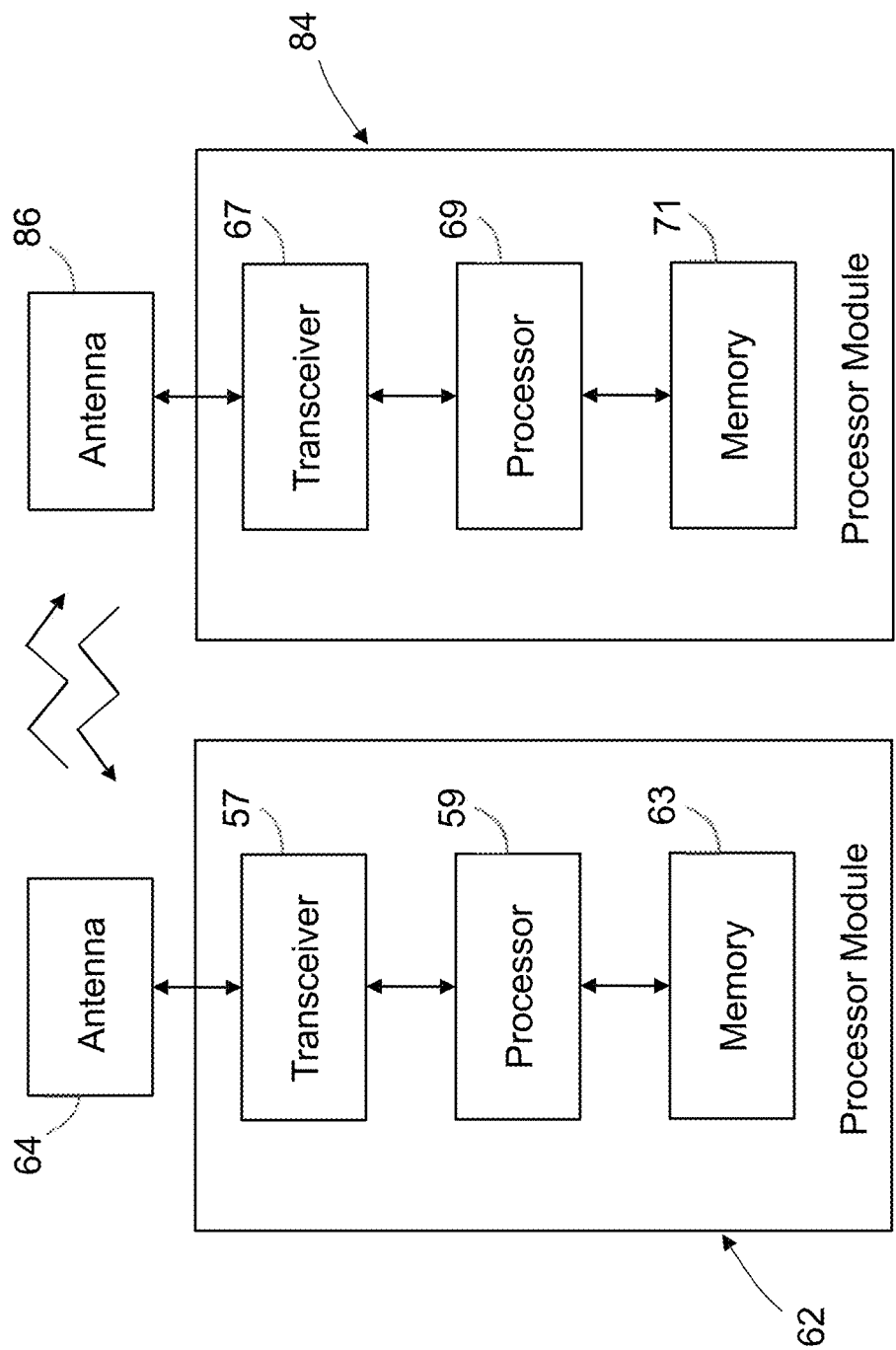
FIG. 23 is a block diagram identifying components of a mobile robot/probe and a sensor node capable of transferring data.

FIG. 23 is a block diagram identifying the components of the automated motion platform and the sub-surface sensor node (depicted in FIG. 4) which are involved in the transfer of sensor data from the sensor node to the motion platform and/or probe and the transfer of computer instructions from the motion platform and/or probe to the sensor node via the antennas 64 and 86. The processor module 62 of the motion platform includes computer memory 63 (e.g., semiconductor memory) for storing sensor data and computer instructions, a processor 59 connected to computer memory 63, and a transceiver 57 connected to processor 59 and to antenna 64. Similarly, the processor module 84 of the sensor node includes computer memory 71 (e.g., semiconductor memory) for storing sensor data and computer instructions, a processor 69 connected to computer memory 71, and a transceiver 67 connected to processor 69 and to antenna 86. In the case of data transfer, the processor 69 retrieves sensor data from computer memory 71 and sends the sensor data to processor 59 via transceiver 67, antenna 86, antenna 64, and transceiver 57. The processor 59 then stores the sensor data in computer memory 63. In the case of the transfer of computer instructions, the processor 59 retrieves computer instructions from computer memory 63 and may send the computer instructions to processor 69 via transceiver 57, antenna 64, antenna 86, and transceiver 67. The processor 69 then stores the computer instructions in computer memory 71.

While methods for through-structure power and data transfer between a mobile robot and a sub-surface sensor node in a limited-access structure have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

The methods described herein may be encoded as executable instructions embodied in a non-transitory tangible computer-readable storage medium, including, without limitation, a storage device and/or a memory device. Such instructions, when executed by a processing or computing system, cause the system device to perform at least a portion of the methods described herein.

In the method claims appended hereto, alphabetic ordering of steps is for the sole purpose of enabling subsequent short-hand references to antecedent steps and not for the purpose of limiting the scope of the claim to require that the method steps be performed in alphabetic order. In other words, the method claims recite steps of the claimed methods but do not require that the steps occur in the order recited or listed in the claims.

The invention claimed is:

1. A system comprising:
a target object comprising a skin;
a sensor node attached to the target object at a position on one side of the skin of the target object; and
an automated motion platform disposed on another side of the skin of the target object, wherein the automated motion platform comprises:
a power source;
a first inductive charging circuit connected to the power source;
a first transducer connected to the first inductive charging circuit;
a first processor module connected to the power source and comprising a first transceiver; and
a second transducer connected to the first transceiver,
wherein the first and second transducers have respective planar spiral configurations which are mutually coplanar and the first inductive charging circuit is configured to tune the first transducer to produce a magnetic field that oscillates at a resonant frequency, and
wherein the sensor node comprises:
a battery;
a sensor connected to the battery;
a second inductive charging circuit connected to the battery;
a third transducer connected to the second inductive charging circuit;
a second processor module connected to the battery and comprising a second transceiver; and
a fourth transducer connected to the second transceiver.

2. The system as recited in claim 1, wherein the third transducer is aligned with the first transducer.

3. The system as recited in claim 1, wherein the fourth transducer is aligned with the second transducer.

4. The system as recited in claim 1, wherein the first transducer surrounds the second transducer and the third transducer surrounds the fourth transducer.

5. The system as recited in claim 1, wherein the first and second transducers are disposed side by side and the third and fourth transducers are disposed side by side.

6. The system as recited in claim 1, wherein the target object is an aircraft.

7. The system as recited in claim 1, wherein the target object further comprises a stringer attached to the skin and a rib attached to the stringer, and wherein the third and fourth transducers are attached to the skin and the sensor is attached to the rib.

8. The system as recited in claim 1, wherein the automated motion platform further comprises a frame, a plurality of rotor motors mounted to the frame, and a plurality of rotors respectively operatively coupled to the plurality of rotor motors, and the first and second transducers are mounted to the frame.

9. The system as recited in claim 1, wherein the automated motion platform further comprises a frame and a plurality of wheels rotatably coupled to the frame, and the first and second transducers are mounted to the frame.

10. The system as recited in claim 1, wherein the automated motion platform further comprises a mobile base, a plurality of wheels rotatably coupled to the mobile base, and an articulated arm having a distal end, wherein the first and second transducers are mounted on the distal end of the articulated arm.

11. A system comprising:
a target object comprising a skin;
a sensor node attached to the target object at a position on one side of the skin of the target object; and
an automated motion platform disposed on another side of the skin of the target object, wherein the automated motion platform comprises:
a power source;
a probe connected to the power source; and
a first processor module connected to the power source and comprising a first transceiver,
wherein the probe comprises:
a first inductive charging circuit connected to the power source;
a first inductive charging coil connected to the first inductive charging circuit; and
a first radiofrequency antenna connected to the first transceiver,
wherein the first inductive charging coil and first radiofrequency antenna have respective planar configurations which are mutually coplanar and the first inductive charging circuit is configured to tune the first inductive charging coil to produce a magnetic field that oscillates at a resonant frequency, and
wherein the sensor node comprises:
a battery;
a sensor connected to the battery;
a second inductive charging circuit connected to the battery;
a second inductive charging coil connected to the second inductive charging circuit;
a second processor module connected to the battery and comprising a second transceiver; and
a second radiofrequency antenna connected to the second transceiver.

12. The system as recited in claim 11, further comprising a frame, a plurality of rotor motors mounted to the frame, and a plurality of rotors respectively operatively coupled to the plurality of rotor motors, wherein the probe is mounted to the frame.

13. The system as recited in claim 12, wherein the frame comprises a body frame and a probe support frame pivotably coupled to the body frame by a gimbal pivot, the rotor motors are mounted on the body frame, and the probe is mounted to the probe support frame.

14. The system as recited in claim 11, further comprising a frame and a plurality of wheels rotatably coupled to the frame, wherein the probe is mounted to the frame.

15. The system as recited in claim 11, further comprising a mobile base, a plurality of wheels rotatably coupled to the mobile base, and an articulated arm having a distal end, wherein the probe is mounted on the distal end of the articulated arm.

16. The system as recited in claim 11, wherein the second inductive charging coil is aligned with the first inductive charging coil.

17. The system as recited in claim 11, wherein the second radiofrequency antenna is aligned with the first radiofrequency antenna.

18. The system as recited in claim 11, wherein the first inductive charging coil surrounds the first radiofrequency antenna and the second inductive charging coil surrounds the second radiofrequency antenna.

19. The system as recited in claim 11, wherein the first inductive charging coil and first radiofrequency antenna are disposed side by side and the second inductive charging coil and second radiofrequency antenna are disposed side by side.

20. The system as recited in claim 11, wherein the target object further comprises a stringer attached to the skin and a rib attached to the stringer, and wherein the second inductive charging coil and second radiofrequency antenna are attached to the skin and the sensor is attached to the rib.

* * * * *